(12) United States Patent
Kondo et al.

(10) Patent No.: US 12,547,246 B2
(45) Date of Patent: Feb. 10, 2026

(54) RING-TYPE DEVICE

(71) Applicant: CANON KABUSHIKI KAISHA, Tokyo (JP)

(72) Inventors: Keita Kondo, Tokyo (JP); Yusuke Hokari, Tokyo (JP); Kenichi Nishimura, Tokyo (JP); Akari Komma, Tokyo (JP); Yuka Tani, Tokyo (JP); Hitomi Ogasawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/679,301

(22) Filed: May 30, 2024

(65) Prior Publication Data
US 2024/0411367 A1 Dec. 12, 2024

(30) Foreign Application Priority Data

Jun. 9, 2023 (JP) .................................. 2023-095601
Jun. 9, 2023 (JP) .................................. 2023-095637

(51) Int. Cl.
G06F 3/02 (2006.01)
G06F 3/01 (2006.01)
G06F 3/033 (2013.01)

(52) U.S. Cl.
CPC ............ *G06F 3/014* (2013.01); *G06F 3/0202* (2013.01); *G06F 3/033* (2013.01); *G06F 2203/0331* (2013.01)

(58) Field of Classification Search
CPC ........ G06F 3/014; G06F 3/0202; G06F 3/033; G06F 2203/0331
USPC .................... 345/157, 158, 169, 173, 174, 8
See application file for complete search history.

(56) References Cited

U.S. PATENT DOCUMENTS

| | | | |
|---|---|---|---|
| 2011/0210931 A1* | 9/2011 | Shai ..................... | G06F 3/03547 345/173 |
| 2015/0277559 A1* | 10/2015 | Vescovi .................. | G06F 1/163 345/173 |
| 2022/0085841 A1* | 3/2022 | Grétarsson .............. | G06F 3/014 |

FOREIGN PATENT DOCUMENTS

| | | |
|---|---|---|
| JP | 2006-302204 | 11/2006 |
| WO | 2023/286316 | 1/2023 |

* cited by examiner

*Primary Examiner* — Julie Anne Watko
(74) *Attorney, Agent, or Firm* — Venable LLP

(57) ABSTRACT

A ring-type device to be worn on a user's finger includes an annular body having an inner surface surrounding a wearing space and an outer surface opposite the inner surface, a first operating portion provided on the outer surface, second operating portions provided on the outer surface at a position different from the first operating portion, and a rib provided between the first operating portion and the second operating portions on the outer surface.

14 Claims, 27 Drawing Sheets

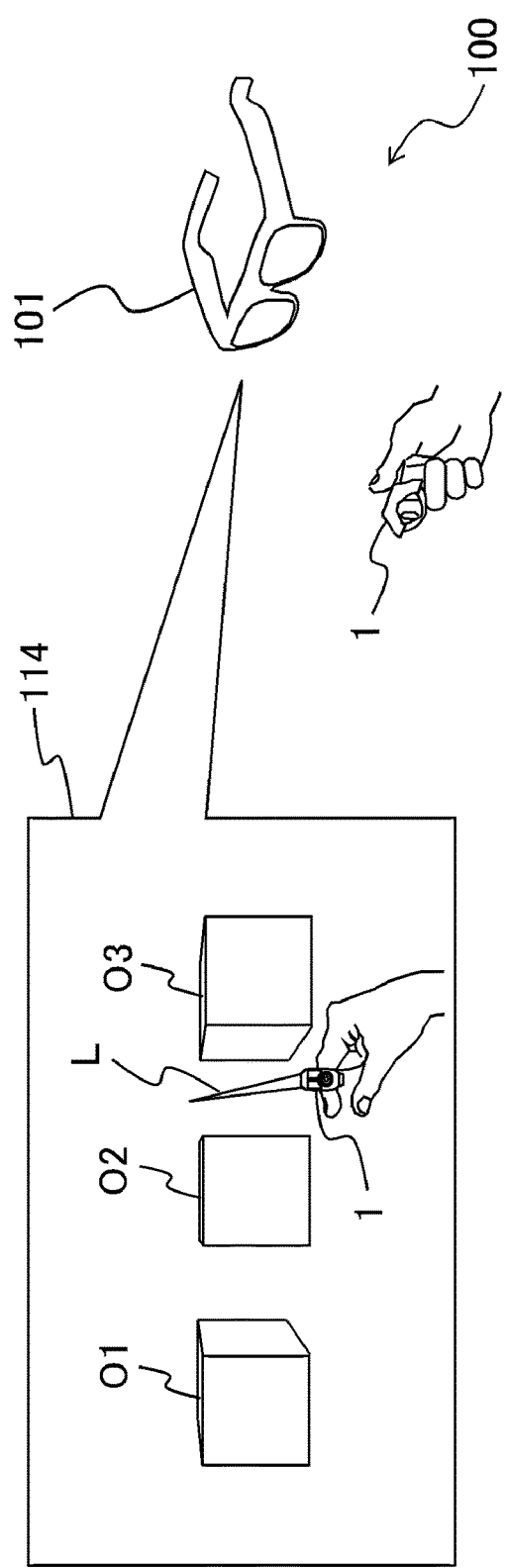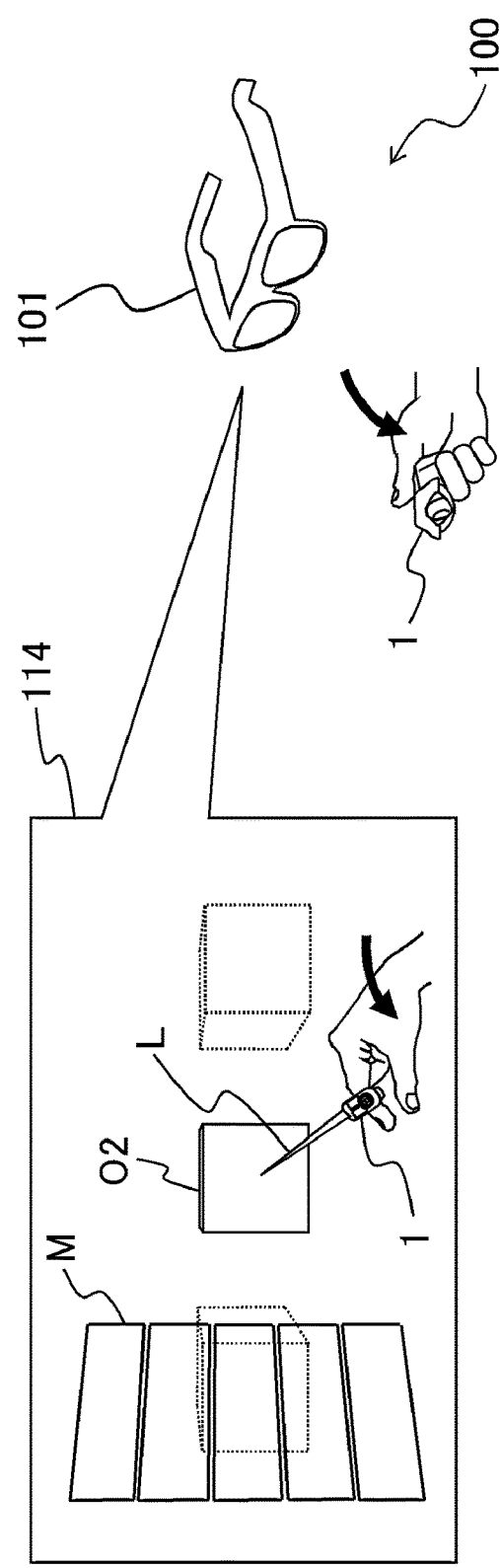

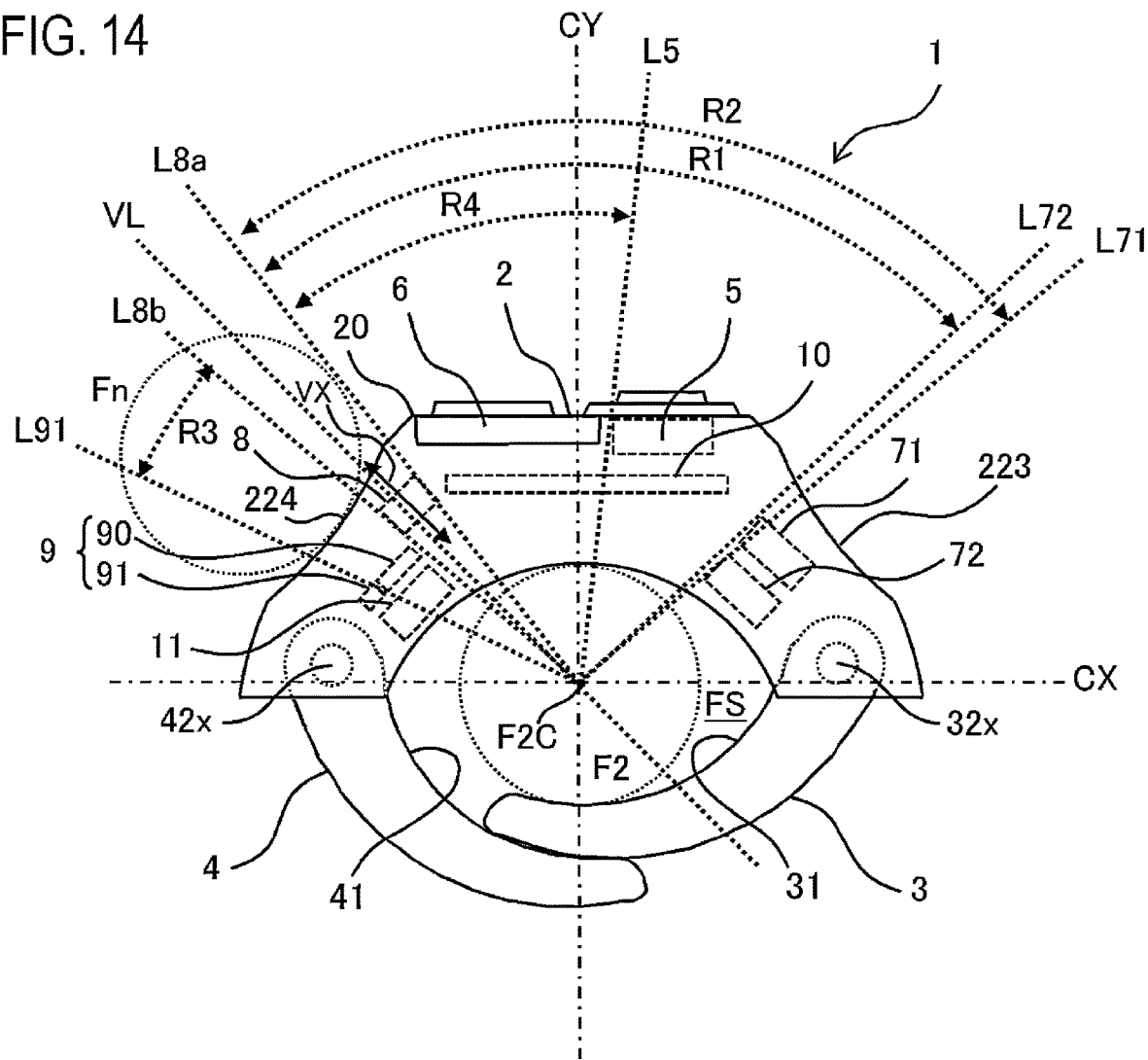

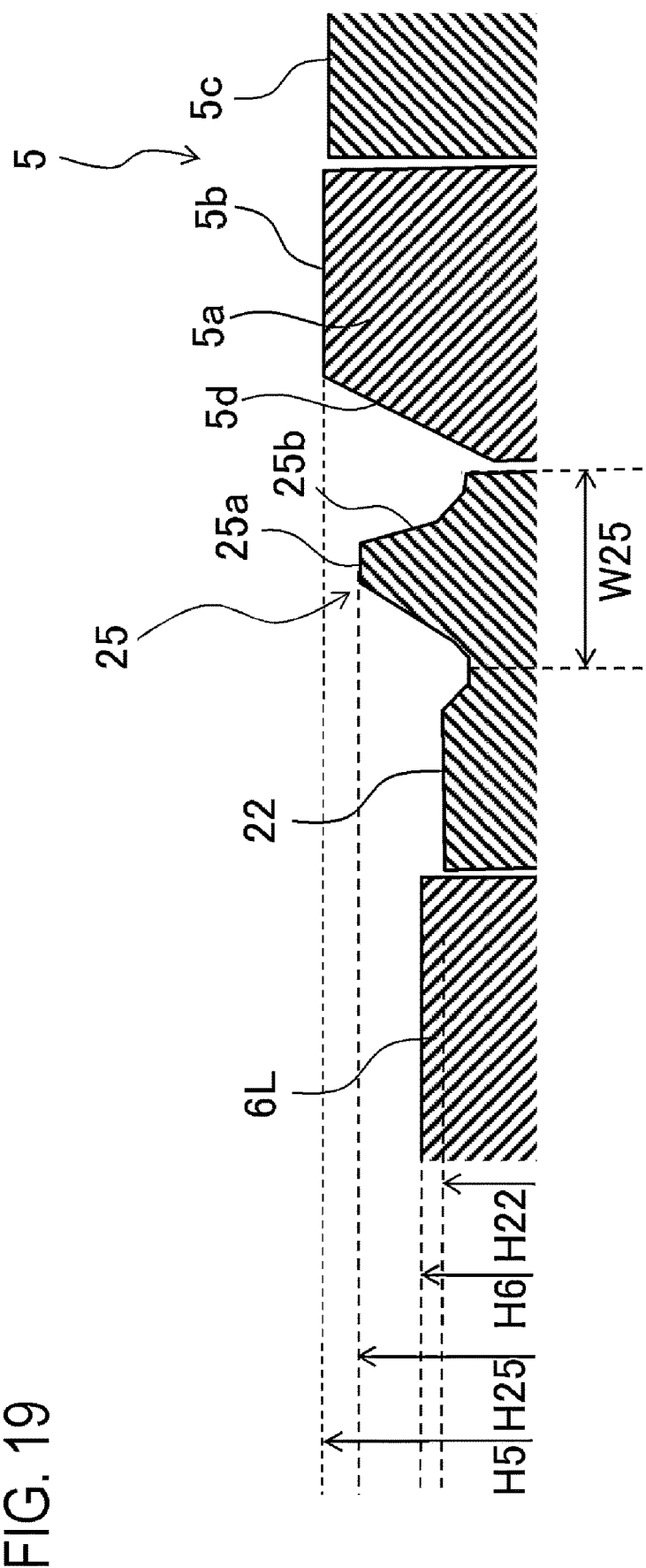

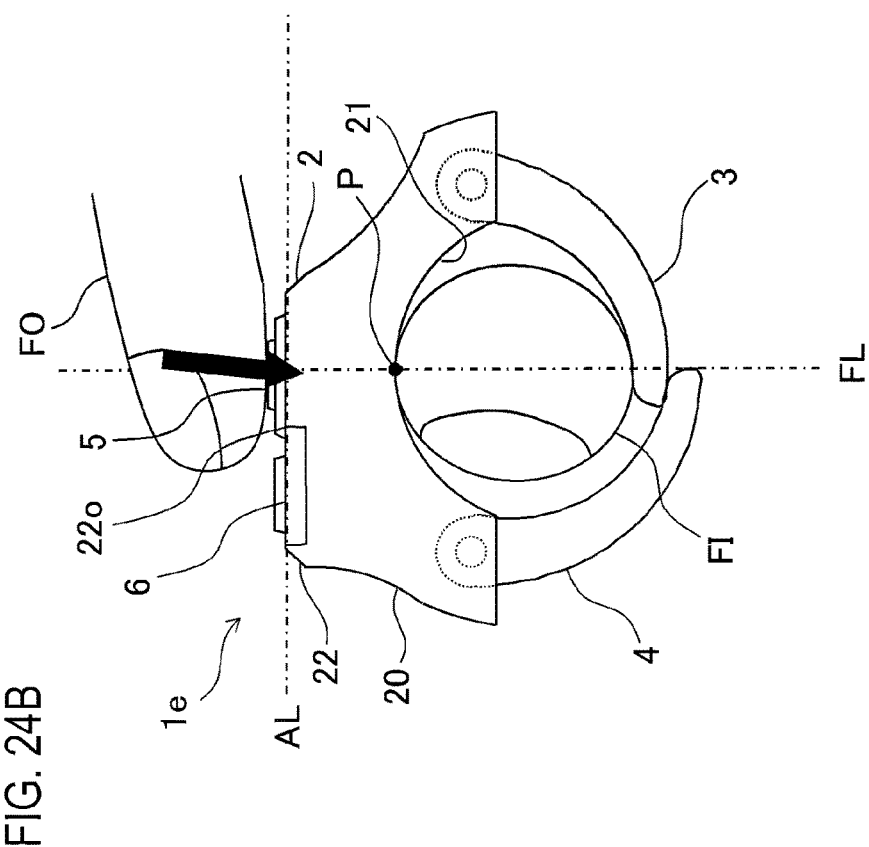
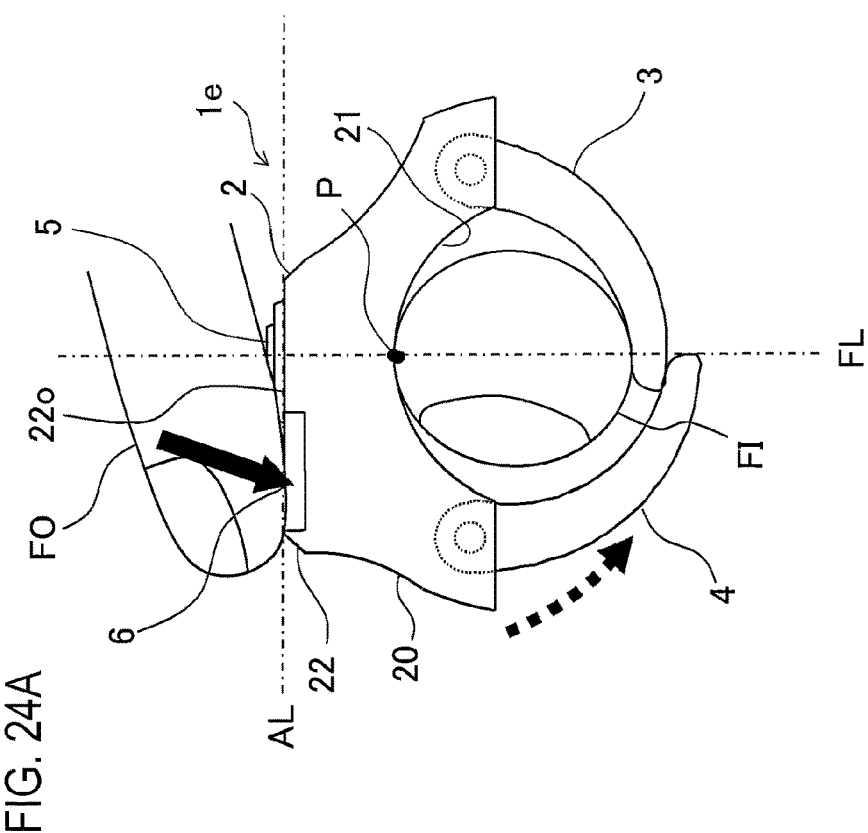

RING-TYPE DEVICE

BACKGROUND OF THE INVENTION

Field of the Invention

The present invention relates to a ring-type device used to operate an information processing device.

Description of the Related Art

A ring-type operating device that is worn on a finger has appeared as a device for operating an information processing device (WO 2023/286316), and has attracted attention in recent years as an operation input unit to replace conventional mouses, keyboards, touch pads, and the like.

From the viewpoint of reducing the burden on the fingers, it is preferable that such a ring-type device is as light as possible. In addition, the fit when worn on the finger is also important. That is, it is important to ensure that a stable posture can be maintained when worn on the finger and prevent the finger or hand from being forced into an unnatural posture or feeling a sense of strangeness during wearing, for example. Furthermore, whether it is easy to perform various operations when worn on the finger, that is, operability is also important.

SUMMARY OF THE INVENTION

A ring-type device that is operated in a state of being worn on a finger is required to have operability that allows various input operations to be performed by relying on the feel of the finger without looking at the hand wearing the ring-type device. On the other hand, the ring-type device is designed to be as small as possible (especially a configuration with a narrow width in the insertion direction of the finger) from the viewpoint of wearability on the finger, and the size of the operating portions such as buttons used for input operations must also be small. Therefore, a device is required to allow the user to identify an operating portion by the touch of the finger alone without looking at the ring-type device. In particular, when a plurality of operating portions are provided, it is necessary to allow the user to distinguish the arrangement and differences of the operating portions by the touch of the finger alone, and to prevent erroneous operations such as operating one operating portion by mistake while operating another operating portion.

The object of the present invention is to provide a technology that can improve the operability of the operating portions in a ring-type device having a plurality of operating portions.

To achieve the above-mentioned object, a ring-type device of the present invention includes an annular body having an inner surface surrounding a wearing space and an outer surface opposite to the inner surface;

a first operating portion provided on the outer surface;

a second operating portion provided on the outer surface at a position different from the first operating portion; and a rib provided between the first operating portion and the second operating portion on the outer surface.

To achieve the above-mentioned object, a ring-type device of the present invention includes a main body having an outer surface on which an operating unit is provided and an inner surface forming a wearing space;

a first arm connected to a first end of the main body in a direction surrounding the wearing space and facing the inner surface across the wearing space; and a second arm connected to a second end of the main body opposite the first end in the direction and facing the inner surface across the wearing space, wherein the first arm and the second arm are each rotatably attached to the main body with variable opposing distances from the inner surface, and a tip of the first arm in a case of closest proximity to the inner surface is located closer to a rotation axis of the second arm than a tip of the second arm in a case of closest proximity to the inner surface.

Further features of the present invention will become apparent from the following description of exemplary embodiments with reference to the attached drawings.

BRIEF DESCRIPTION OF THE DRAWINGS

FIGS. 2A and 2B are diagrams illustrating an outline of an information processing system 100;

FIG. 14 is a schematic front view showing the configuration of the ring-type device 1;

FIG. 19 is a schematic cross-sectional view taken along arrow E in FIG. 18;

FIGS. 24A and 24B are schematic front views of a ring-type device 1e according to a third comparative example;

DESCRIPTION OF THE EMBODIMENTS

In the following examples, the embodiments of the present disclosure will be described by way of example. However, the configurations disclosed in the following examples, such as the functions, materials, shapes, and relative arrangements of the components, show examples of forms related to the scope of the claims and are not intended to limit the scope of the claims to the configurations disclosed in these examples. Furthermore, the problems solved by the configurations disclosed in the following examples or the operations or effects obtained from the disclosed configurations are not intended to limit the scope of the claims.

First Embodiment

With reference to FIGS. 1A to 25B, a ring-type device 1 according to a first embodiment of the present invention will be described.

Outline of Ring-Type Device

Figure 1C:
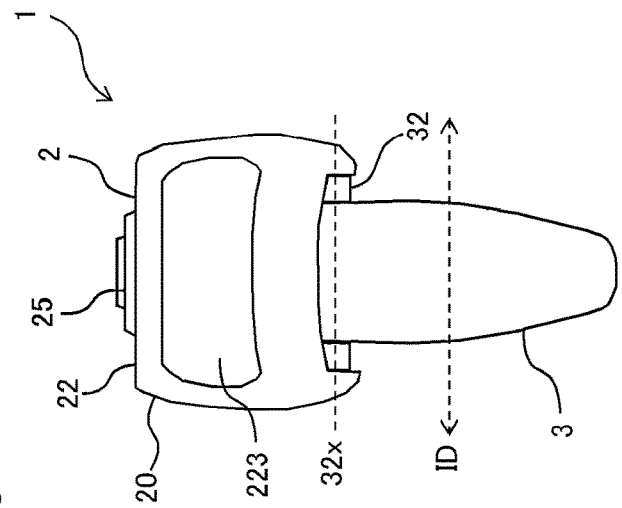
FIGS. 1A to 1C are schematic diagrams showing the configuration of a ring-type device 1 according to a first embodiment of the present invention.
Figure 1A:
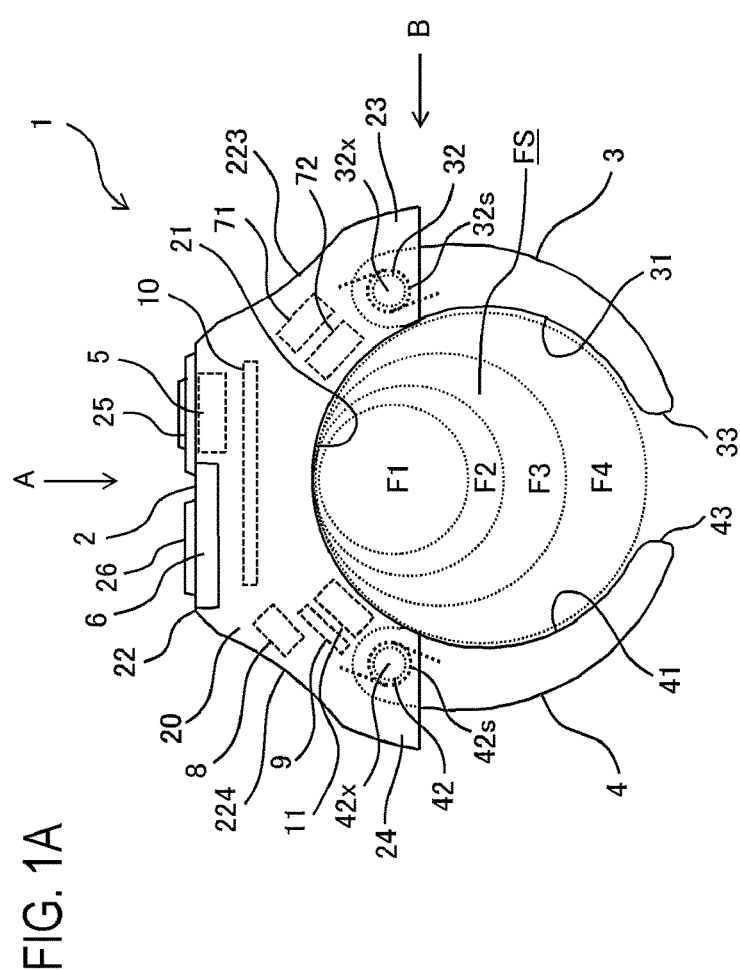
Figure 1B:
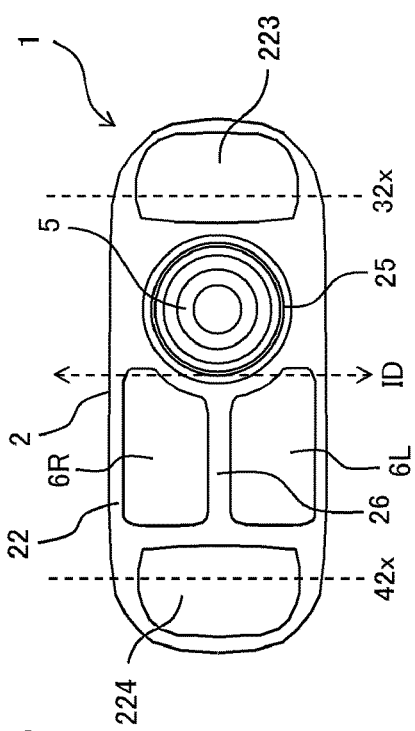

FIGS. 1A to 1C are schematic diagrams showing the configuration of the ring-type device 1 according to the first embodiment of the present invention. FIG. 1A is a front view of the ring-type device 1 when the ring-type device 1 is viewed in the insertion direction of the finger. FIG. 1B is a top view of the ring-type device 1 as viewed from arrow A in FIG. 1A showing the configuration of the operating surface of the ring-type device 1. FIG. 1C is a side view of the ring-type device 1 as viewed from arrow B in FIG. 1A.

As shown in FIG. 1A, the ring-type device 1 of the present embodiment has a roughly annular outer shape and is configured so that a user can insert a finger F into the central hole. More specifically, the ring-type device 1 includes a main body 2, a first arm 3, and a second arm 4, which are connected in a ring shape to form a wearing space FS into which the user's finger F can be inserted (they form an annular body surrounding the wearing space FS).

Here, in the present specification, the term "annular" does not only refer to an annular configuration that completely closes the outer circumference of the wearing space FS, but a shape configuration that is partially interrupted and discontinuous, such as a roughly C-shape, but has a roughly annular shape is also referred to as an annular shape.

The main body 2 has a cladding 20 that is roughly arc-shaped, and the cladding 20 has a concave arc-shaped inner surface 21 that forms the wearing space FS, and an outer surface 22 opposite the inner surface 21.

The first arm 3 is connected to a first end 23 that is one end of the main body 2 in the direction surrounding the wearing space FS, and extends in a roughly arc-shaped manner from the first end 23 of the main body 2 in one direction (first direction) in the surrounding direction. The first arm 3 has a concave arc-shaped inner surface 31 that forms the wearing space FS, and the inner surface 31 faces the inner surface 21 of the main body 2 across the wearing space FS. The first arm 3 is rotatably attached to the first end 23 of the main body 2 so that the opposing distance between the inner surface 31 and the inner surface 21 of the main body 2 can be varied.

The second arm 4 is connected to a second end 24, which is the other end of the main body 2 in the direction surrounding the wearing space FS, and extends in a substantially arc-shape manner from the second end 24 of the main body 2 in the other direction (second direction) in the surrounding direction. The second arm 4 has a concave arc-shaped inner surface 41 that forms the wearing space FS, and the inner surface 41 faces the inner surface 21 of the main body 2 across the wearing space FS. The second arm 4 is rotatably attached to the second end 24 of the main body 2 so that the opposing distance between the inner surface 41 and the inner surface 21 of the main body 2 can be varied.

The first arm 3 is biased by a torsion coil spring 32s as a first biasing member, and the second arm 4 is biased by a torsion coil spring 42s as a second biasing member, in a direction to close the wearing space FS, that is, in a direction to narrow the opposing distance with respect to the inner surface 21 of the main body 2. Therefore, the first arm 3 and the second arm 4 can each rotate with respect to the main body 2 in accordance with the thickness (diameter) of the finger F inserted into the wearing space FS. In other words, the opposing distance between the first arm 3 and the second arm 4 and the inner surface 21 of the main body 2 changes depending on the thickness (diameter) of the finger F inserted into the wearing space FS, and the width of the wearing space FS can be changed.

Here, a rotation axis 32x of the rotation shaft 32 relative to the main body 2 of the first arm 3 and a rotation axis 42x of the rotation shaft 42 relative to the main body 2 of the second arm 4 are each oriented along the insertion direction ID of the finger F relative to the wearing space FS. In the present embodiment, the rotation axis 32x, the rotation axis 42x, and the insertion direction ID are configured to be parallel to each other, but the present invention is not limited to such a configuration. As long as the same effect as in the present embodiment can be obtained, that is, the width of the wearing space FS can be changed without affecting the wearing property and operability, the rotation axis 32x, the rotation axis 42x, and the insertion direction ID may be configured to be inclined to each other within a predetermined range instead of being parallel to each other.

Configuration of Main Body

The main body 2 has a touch sensor 5 and a button switch 6 built into the outer surface 22 of the cladding 20. The touch sensor 5 and the button switch 6 are arranged side by side in a direction surrounding the wearing space FS. As shown in FIG. 1B, the button switch 6 is arranged symmetrically in the insertion direction ID of the finger F. A first finger rest 223 and a second finger rest 224 are provided on both sides in the surrounding direction of an operation portion of the outer surface 22, in which the touch sensor 5, the button switch 6, and the like are arranged. The first finger rest 223 and the second finger rest 224 are formed in a concave shape so that, for example, a finger adjacent to the finger inserted into the wearing space FS can be placed thereon. In addition, an inertial sensor 71, a geomagnetic sensor 72, a vibration element 8, a communication unit 9, a control unit 10, a power source 11, and the like are provided inside the main body 2 (inside the cladding 20).

Details of the touch sensor 5 and the button switch 6 will be described later.

The inertial sensor 71 includes an acceleration sensor for detecting the position and speed of the ring-type device 1 equipped with the inertial sensor 71, a gyro sensor (angular velocity sensor) for detecting the posture and orientation of the ring-type device 1, and the like. The detection data of the earth's magnetic force from the geomagnetic sensor 72 is used to correct the detection data of the inertial sensor 71.

The vibration element 8 is used to generate vibration in the ring-type device 1 and provide the vibration as tactile information to the user's finger F. The communication unit 9 includes, for example, a wireless module, a wireless antenna, and the like, and can communicate with an external device by wireless communication such as Wi-Fi® or Bluetooth®.

The control unit 10 includes, for example, a CPU as a calculation processing unit, a ROM, a RAM, and the like as a storage unit for storing programs, calculation parameters, and the like, and controls the overall operation of the ring-type device 1. The power source 11 supplies electric power to each part of the ring-type device 1.

Outline of Information Processing System

Figure 3:
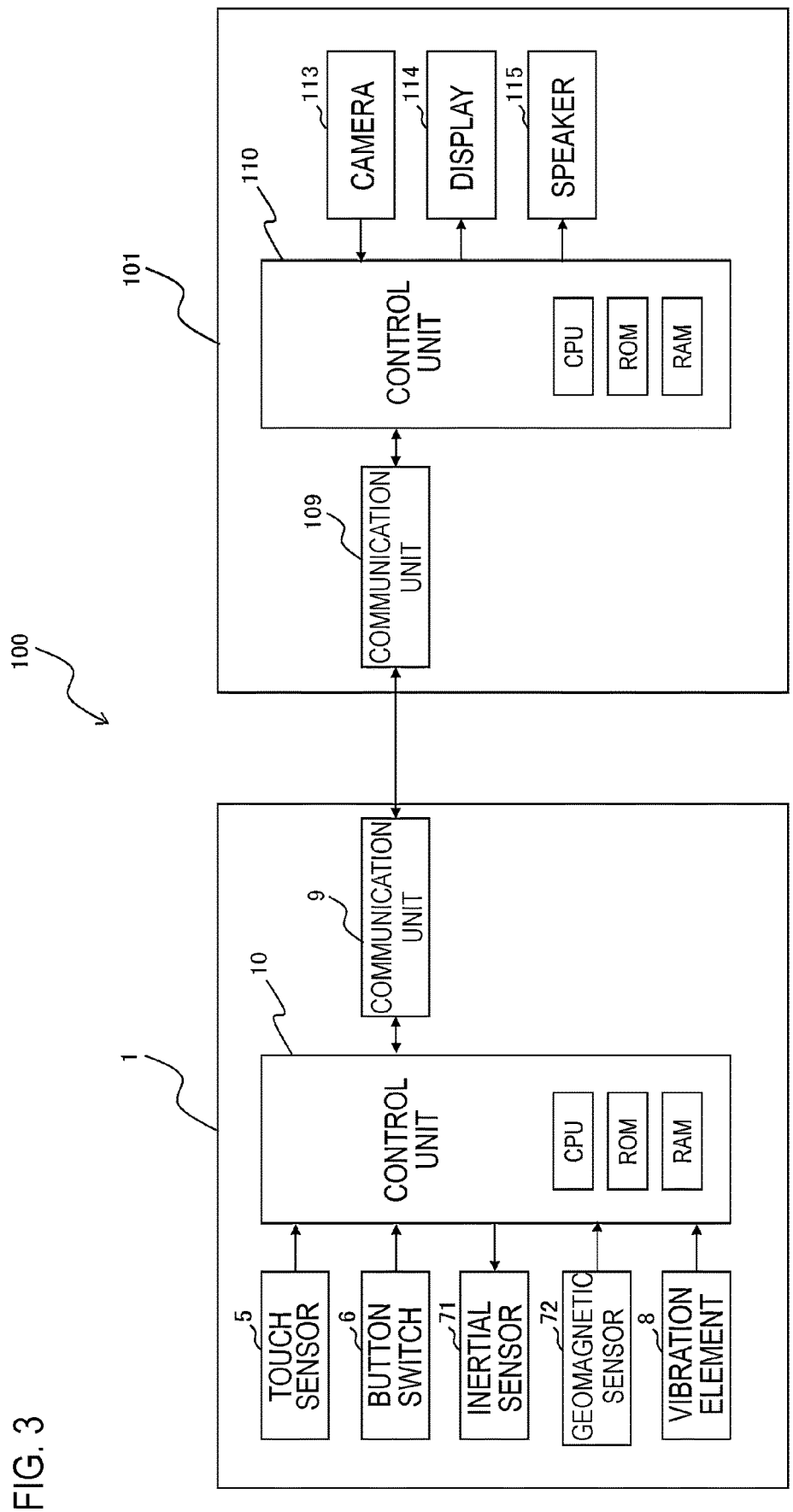
FIG. 3 is an explanatory diagram of the control configuration of the information processing system 100.

With reference to FIGS. 2A, 2B and 3, an outline of an information processing system 100 in which the ring-type device 1 according to the present embodiment is used will be described.

The information processing system 100 shown in FIGS. 2A, 2B, and 3 is a system that uses an HMD (head-mounted display) 101 to provide a user with a so-called MR (mixed reality) space. The HMD 101 is equipped with a camera 113 for capturing an image of the space in front of the user wearing the HMD 101 facing, and a display 114 for displaying a video image as seen by the user wearing the HMD 101. The control unit 110 is equipped with, for example, a CPU as a calculation processing unit, a ROM, a RAM, and the like as a storage unit for storing programs, calculation parameters, and the like, and controls the overall operation of the HMD 101. The display 114 displays a video image in which an image of an intangible virtual object or the like generated by signal processing in the HMD 101 is superimposed on the real space imaged by the camera 113.

The ring-type device 1 and the HMD 101 are connected to each other by wire or wireless communication through the communication unit 9 and the communication unit 109, and can transmit and receive data to and from each other.

The user can use the ring-type device 1 to perform various input operations on virtual objects and the like displayed on the display 114. For example, various input operations can be performed by changing the orientation of the ring-type device 1, operating the touch sensor 5 or the button switch 6 provided on the operation portion of the ring-type device 1, or by combining these operations in various ways.

In the example shown in FIG. 2A, three virtual objects O1 to O3 are arranged side by side in front of the eyes of the user wearing the HMD 101. From the ring-type device 1 worn on the finger of the user, a virtual light beam L is projected on the display 114 so as to extend forward in a direction corresponding to the orientation of the ring-type device 1. The virtual light beam L is a so-called laser pointer-type user interface.

FIG. 2B shows a state when a user operates the ring-type device 1 and selects a virtual object O2 from the three virtual objects O1 to O3. The user can perform an operation of selecting the virtual object O2 by changing the position or orientation of the ring-type device 1 so that the virtual light beam L hits the virtual object O2, and for example, tapping the touch sensor 5 of the operation portion. By selecting the virtual object O2, various information displays related to the virtual object O2 and menu displays for performing various input operations for the virtual object O2 are displayed as virtual objects M next to the virtual object O2. Various input operations can also be performed on the virtual object M using the ring-type device 1.

In addition, in a system that can recognize a real three-dimensional structure from an image captured by the camera 113, virtual input operations can be performed on the recognized three-dimensional structure using the ring-type device 1.

In addition, the speaker 115 outputs a sound corresponding to the operation state of the ring-type device 1 and the state in the MR space displayed on the display 114, and audio information is provided to the user along with visual information. Furthermore, the vibration element 8 generates vibration corresponding to the operation state of the ring-type device 1 and the state in the MR space displayed on the display 114, and transmits the vibration to the finger or hand wearing the ring-type device 1. That is, tactile information corresponding to the visual information and audio information is provided to the user.

Here, the above-mentioned information processing system 100 is a system using a so-called video see-through method, but the ring-type device 1 according to the present embodiment can also be used in a system using an optical see-through method. That is, the information processing system 100 is a system configured to project the real space directly to the user's eyes through the lens provided in the HMD 101, rather than the image displayed by the display 114, and display virtual objects and the like on the lens. Alternatively, the ring-type device 1 according to the present embodiment can also be used in a system in which a video is projected onto the user's retina to allow the user to visually recognize a virtual object.

The above-mentioned information processing system 100 can also be used to display a VR (virtual reality) space generated only by signal processing in the HMD 101 on the display 114 without using the image captured by the camera 113. In other words, the information processing system 100 may be used as a system that provides a VR (virtual reality) space to a user, and various input operations can be performed in such a VR space using the ring-type device 1 of the present embodiment.

Details of Ring-Type Device (Configuration of Operation Portion)

The touch sensor 5 detects the contact of the finger F and sends an input signal to the control unit 10, and is configured to be able to send various types of input signals to the control unit 10 by changing the way the finger F is contacted. Specifically, examples of an input operation include a tap operation in which the finger F is momentarily brought into contact with the touch sensor 5 as if tapping and then released, and a swap operation in which the finger F is brought into contact with the touch sensor 5 as if sliding, thereby changing the contact position of the finger F on the touch sensor 5. By such various input operations, a virtual object selection operation, a scroll operation, and the like can be performed. In addition, an operation in which a predetermined state is maintained only while the finger F is touching the touch sensor 5 is possible. For example, an operation in which the state in which the virtual light beam L is emitted is maintained only while the finger F is touching the touch sensor 5, and the virtual light beam L is no longer emitted when the finger F is removed from the touch sensor 5 is possible. Alternatively, an operation in which the selection state of the virtual object is maintained only while the finger F is touching the touch sensor 5, and the selection state of the virtual object is released when the finger F is removed from the touch sensor 5 is possible.

A pair of button switches 6L and 6R may be used, for example, when performing an alternative selection operation or an opposite selection operation. For example, as shown in FIG. 2B, in a state in which the virtual object O2 is selected, the selection object may be changed to the virtual object O1 on the left when the button switch 6L is pressed, and the selection object may be changed to the virtual object O3 on the right when the button switch 6R is pressed.

Details of Ring-Type Device (Wearing Method)

Figure 4A:
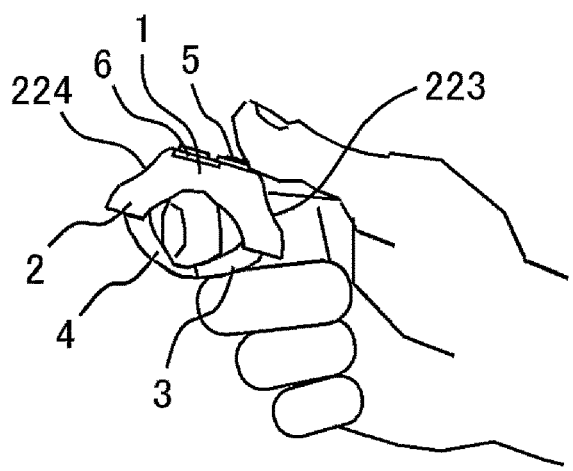
FIGS. 4A to 4C are schematic diagrams showing an example of a wearing mode of the ring-type device 1.
Figure 4B:
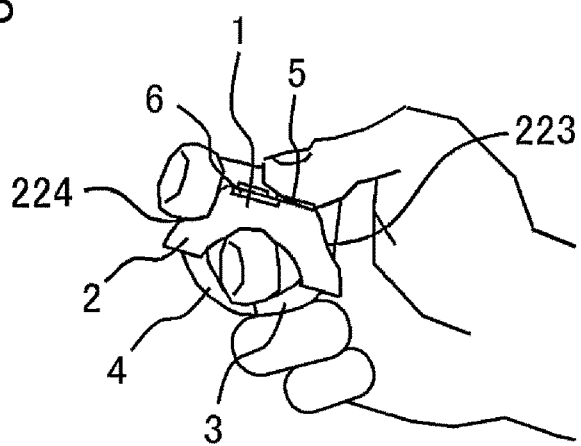
Figure 4C:
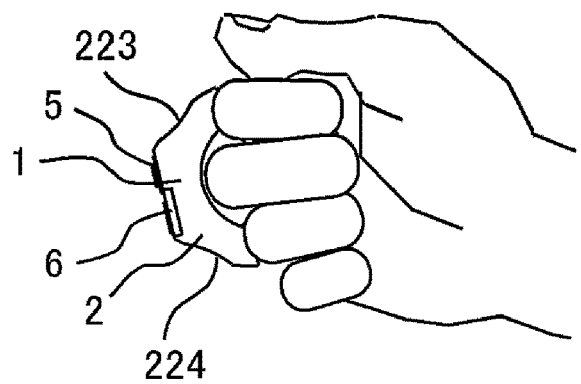

FIG. 4A is a schematic diagram showing a first wearing mode, which is an example of a wearing mode when the ring-type device 1 is used. FIG. 4B is a schematic diagram showing a second wearing mode, which is another example of a wearing mode when the ring-type device 1 is used. FIG. 4C is a schematic diagram showing a third wearing mode, which is an example of a wearing mode when the ring-type device 1 is not used. Note that the wearing mode shown here is merely an example, and the wearing mode of the ring-type device 1 of the present embodiment is not limited to the following.

The first wearing mode shown in FIG. 4A is a wearing mode when the ring-type device 1 is worn on the index finger. That is, it is a wearing mode in which the index finger is inserted into the wearing space FS and various operations are performed with the thumb. In this wearing mode, the thumb can be placed on the first finger rest 223.

The second wearing mode shown in FIG. 4B is a wearing mode when the ring-type device 1 is worn on the middle finger. That is, in this wearing mode, the middle finger is inserted into the wearing space FS, and various operations are mainly performed with the thumb. In this wearing mode, the thumb can be placed on the first finger rest 223, and the index finger can be placed on the second finger rest 224.

The third wearing mode shown in FIG. 4C is a wearing mode for a case where, for example, the ring-type device 1 is not used at the moment but is to be held. As shown in FIG. 4C, the third wearing mode is a gripping mode in which the orientation of the ring-type device 1 is held while changing from the wearing modes shown in FIGS. 4A and 4B. The ring-type device 1 is configured such that the volume of the main body 2 is relatively large compared to the first arm 3 and the second arm 4. In the third wearing mode, the first arm 3 and the second arm 4 are gripped in the palm of the hand. On the other hand, in the first and second wearing modes, a part of the main body 2 is gripped in the palm of the hand. That is, in the third wearing mode, the volume of the ring-type device 1 on the palm side is reduced compared to the first and second wearing modes, making it easier to grip and hold the ring-type device 1, and the ring-type device 1 is prevented from interfering with other tasks.

Details of Ring-Type Device (Arm Configuration)

Figure 5A:
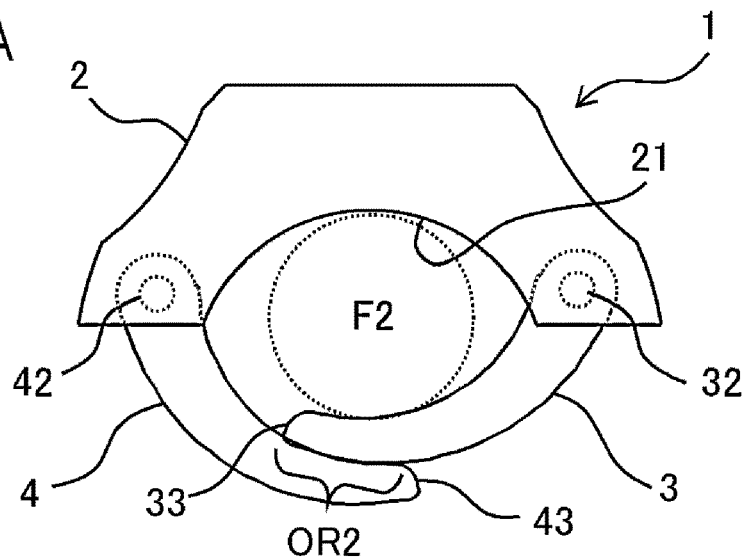
FIGS. 5A to 5C are schematic diagrams illustrating the state of the change in posture of a first arm 3 and a second arm 4.
Figure 5B:
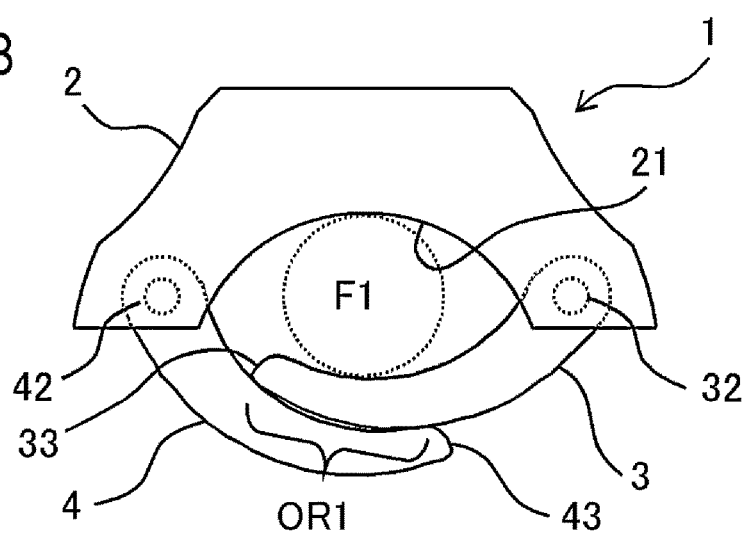
Figure 5C:
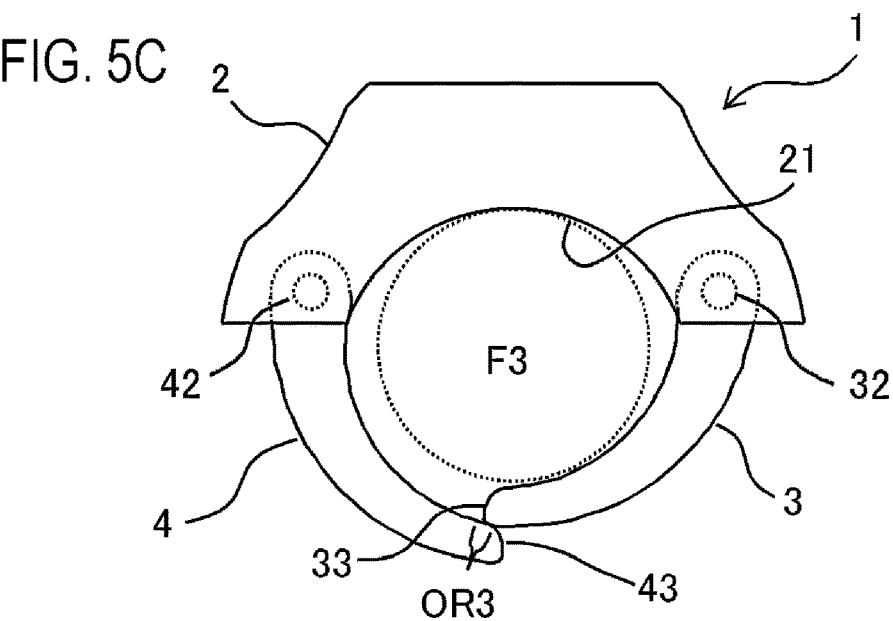
Figure 6A:
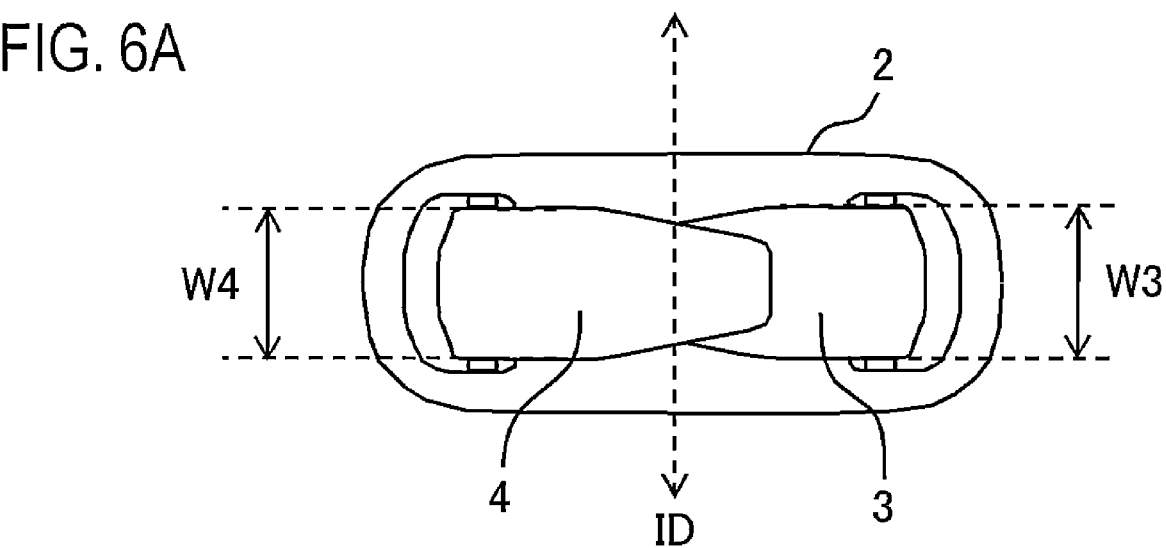
FIGS. 6A and 6B are bottom views of the ring-type device 1.
Figure 6B:
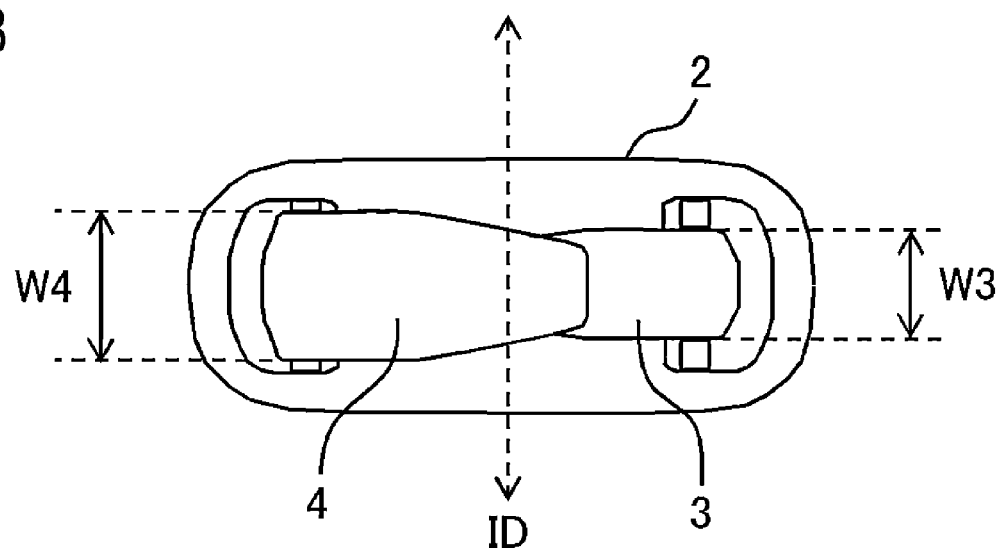

The configuration of the first arm 3 and the second arm 4 of the ring-type device 1 will be described with reference to FIGS. 5A to 5C and 6A and 6B. FIGS. 5A to 5C are schematic diagrams illustrating the change in posture of the first arm 3 and the second arm 4 due to the difference in thickness of the finger F. Here, the ring-type device 1 will be described when worn on a finger F1 of a first thickness (FIG. 5B), a finger F2 of a second thickness thicker than the first thickness (FIG. 5A), and a finger F3 of a third thickness thicker than the second thickness (FIG. 5C). FIG. 6A is a bottom view of the ring-type device 1 as viewed in the opposite direction to arrow A in FIG. 1. FIG. 6B is a bottom view of a ring-type device 1 according to a modified example in which the width of the first arm 3 is changed, which is the same as FIG. 6A.

As shown in FIG. 6A, the first arm 3 and the second arm 4 are arranged so that their positions in the insertion direction ID of the finger F relative to the wearing space FS overlap each other. In addition, the lengths of the first arm 3 and the second arm 4 in the direction surrounding the wearing space FS from the main body 2 are such that their tip-side regions interfere with each other depending on the thickness of the finger F to be mounted. That is, the tip of one of the first arm 3 and the second arm 4 when it is closest to the inner surface 21 of the main body 2 is located closer to the rotation axis of the other arm than the tip of the other arm when it is closest to the inner surface 21.

As shown in FIG. 1A, when the device is worn on a finger F4 of a fourth thickness thicker than the third thickness, the first arm 3 and the second arm 4 are at a large angle relative to the main body 2 and do not interfere with each other. However, as shown in FIGS. 5A to 5C, when the wearing space FS corresponding to the fingers F1 to F3 is formed, the regions at the tip side of the first arm 3 and the second arm 4 interfere with each other. Therefore, the first arm 3 and the second arm 4 cannot both contact the fingers F1 to F3 at the same time, and one of the arms contacts the fingers F1 to F3, while the other arm biases the one arm against the fingers F1 to F3 (supports it from behind). That is, the region including at least the tip of the other arm when it is closest to the inner surface 21 of the main body 2 is located on the outer side of the wearing space FS than the one arm when it is closest to the inner surface 21.

The wearing posture must be formed such that the smaller the thickness of the finger F, the larger the space between the finger F and the wearing space FS, and the wider the gap between the mounted finger F and the adjacent finger F. In other words, there is a concern that the smaller the thickness of the finger F, the more likely it is that the wearing posture of the ring-type device 1 on the finger F will become unstable.

Here, in the ring-type device of the present embodiment, as described above, the one arm that contacts the finger F is supported from behind by the other arm. Furthermore, the region where the other arm contacts the one arm, that is, the region OR where the one arm and the other arm overlap each other when viewed in a direction perpendicular to the rotation axis of the one arm or the rotation axis of the other arm, is configured to become wider as the finger F becomes thinner. As shown in FIGS. 5A to 5C, the contact region between the one arm and the other arm becomes wider in the order of regions OR3, OR2, and OR1 from finger F3 to finger F1. By widening the contact region, the area over which the biasing force that one arm receives from the other arm acts is widened, and the force with which the one arm holds the finger F between the one arm and the inner surface 21 of the main body 2 is increased, resulting in a stable wearing state.

With the above-mentioned configuration, when the thickness of the finger F to be mounted is thin, the contact region between the first arm 3 and the second arm 4 is enlarged, making it possible to prevent the wearing posture of the ring-type device 1 on the finger F from becoming unstable.

In this way, the wearing space FS can be changed to a width corresponding to the fingers F1 to F4 of various sizes (diameters), and the holding force acting on the finger F can be changed according to the thickness of the finger F. In this way, the main body 2, the first arm 3, and the second arm 4 can be stably wrapped around the outer circumference of the finger F even if the size of the inserted finger F differs. In other words, regardless of the size of the finger F inserted into the wearing space FS, the ring-type device 1 is worn and held on the user's finger F in a stable posture.

In the present embodiment, the first arm 3 is disposed inside the second arm 4 and directly contacts the finger F, and the second arm 4 supports the first arm 3 from behind. However, the opposite configuration may be used. That is, the second arm 4 may be disposed inside the first arm 3 and directly contacts the finger F, and the first arm 3 may support the second arm 4 from behind.

The biasing force (spring constant of the torsion coil spring) biasing the first arm 3 and the second arm 4 is preferably set to a magnitude that does not cause a misalignment between the finger F and the ring-type device 1 for a user with a thin finger F. For example, the spring constant of the torsion coil spring may be set by adjusting the number of turns so that a biasing force of 10 N*mm or more is generated. On the other hand, for a user with a thick finger F, if the biasing force is too strong, pain may occur during wearing, so it is preferable to set the biasing force to a level that does not increase the load on the finger F. For example, the spring constant of the torsion coil spring may be set by adjusting the number of turns so that the biasing force is suppressed to 45 N*mm or less. Although it depends on the device configuration, the sprint constant is preferably set to at least 15 N*mm and not more than 30 N*mm. The range of the upper and lower limits of such a biasing force may be found, for example, through experiments, and the spring constants of the torsion coil spring 32a and the torsion coil spring 42a may be set appropriately.

Furthermore, the biasing force biasing the first arm 3 (spring constant of the torsion coil spring 32a) and the biasing force biasing the second arm 4 (spring constant of the torsion coil spring 42a) may be set to the same level. However, this is not limited to this, and for example, in a case where the arm on the inner side and the arm on the outer side with respect to the wearing space FS are determined in advance, the biasing force acting on the inner arm and the biasing force acting on the outer arm may be different to enhance the stability of wearing.

For example, the arm of the first arm 3 and the second arm 4 that is on the outer side of the wearing space FS may be made wider in the insertion direction ID than the arm on the inner side, and the number of turns of the torsion coil spring may be increased relatively to increase the biasing force compared to the arm on the inner side. Alternatively, the inner diameter of the inner surface of the outer arm may be made larger than the inner diameter of the inner surface of the inner arm without making the spring constant different.

In the present embodiment, the wearing space FS is configured to have a width that can accommodate a virtual circle with a predetermined range of diameters (that is, a finger of a thickness equivalent to the virtual circle) when viewed in the insertion direction ID. Specifically, the width is a width that can accommodate a virtual circle from a virtual circle of a diameter of 12.8 mm (a finger F1 of a thickness equivalent to this) to a virtual circle of a diameter of 25.4 mm (a finger F4 of a thickness equivalent to this), that is, a width of at least 12.8 mm and not more than 25.4 mm. As shown in FIG. 1A, the basis for the change in the size of the virtual circle is the deepest part of the concave arc-shaped (concave curved) inner surface 21 of the main body 2. That is, virtual circles of each size are arranged so as to pass through the point of the deepest part, and the spatial region corresponding to the size of the virtual circle is used as the basis for measuring the width of the wearing space FS.

As shown in FIG. 6B, in the insertion direction ID of the finger F with respect to the wearing space FS, the width of the inner arm that contacts the finger F may be narrower than the width of the outer arm. For example, as shown in FIG. 4C, a gripping mode in which the ring-type device 1 is held by changing its orientation is possible. In this wearing state, the side of the finger F facing the arm is the inner side (palm side) of the finger F, which is the side that is concave when the joint of the finger F is bent. In the present embodiment, the width W3 in the insertion direction ID of the first arm 3, which is the inner arm in contact with the finger F, is narrower than the width W4 in the same direction of the second arm 4, which is the outer arm away from the finger F, so that the finger F can be easily bent. In this way, it becomes easier to take a posture in which the finger is gripped to hold the ring-type device 1. For example, when performing another task while holding the ring-type device 1, the operation is prevented from being hindered, and the efficiency of the operation can be improved. In addition, the process of putting on and taking off the ring-type device 1 can be reduced, so that the efficiency of a series of operations can be improved.

In addition, the first arm 3 and the second arm 4 are configured so that the width in the insertion direction ID gradually narrows toward the tip. Here, in particular, the width in the insertion direction ID of the tip surface of the arm that enters inside the wearing space FS is preferably 20 mm or less, or less than the width of the main body 2 in the insertion direction ID. More preferably, the width is 8 mm or less, which is suitable for storing the first arm 3 and the second arm 4 between the first and second joints of the finger F. Alternatively, in the region where the first arm 3 and the second arm 4 overlap each other, the width in the insertion direction ID of the inner arm may fall within the above-mentioned range.

Figure 7A:
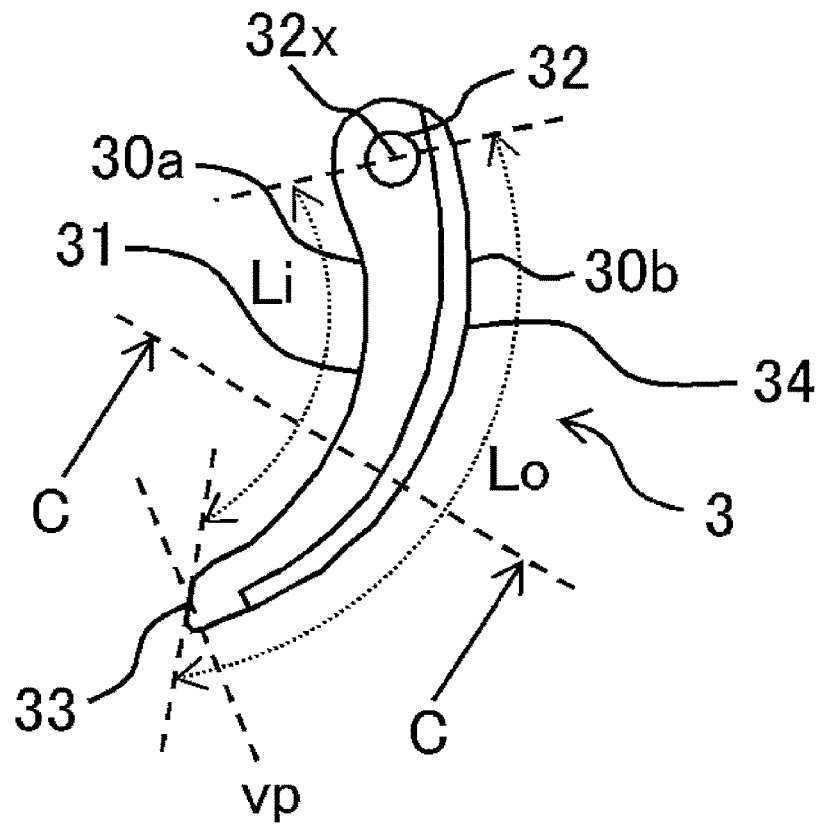
FIGS. 7A and 7B are schematic diagrams of the first arm 3.
Figure 7B:
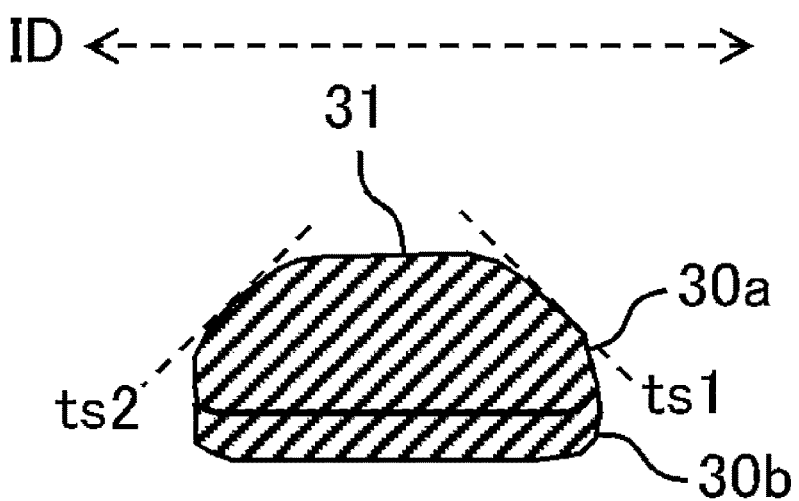

FIG. 7A is a schematic diagram of the first arm 3, and FIG. 7B is a cross-sectional view taken along arrow C in FIG. 7A. Here, only the first arm 3 will be described, but the second arm 4 is configured in the same way, and so the description will be omitted.

The inner surface 31 is the part of the first arm 3 that comes into contact with the finger F, and it is preferable that the surface of the inner surface 31 is particularly smooth. For example, as shown in FIGS. 7A and 7B, the first arm 3 may be configured with two members, a first member 30a on the inner surface 31 side, and a second member 30b on the opposite outer surface 34 side. With this configuration, when manufacturing the first arm 3 by combining a plurality of members, it is possible to position the parting line between the first member 30a and the second member 30b away from the inner surface 31, and it is possible to form the inner surface 31 smoothly. In addition, the parting line between the first member 30a and the second member 30b is preferably located as close as possible to the outer surface 34 in order to more effectively prevent the finger F from getting caught. The inner surface 31 is a gently smooth concave surface, which prevents the finger F from getting caught when the finger F is inserted, and also makes cleaning easier.

In addition, as shown in FIG. 7A, the tip surface 33 (first tip surface) of the first arm 3 may be configured to have a tapered surface shape in order to prevent the finger F from getting caught when the finger F and the ring-type device 1 rotate in relation to each other. That is, the tip surface 33 of the first arm 3 has an inner distance (first inner distance) Li from the rotation axis (first rotation axis) 32x of the first arm 3 on the inner surface (first inner surface) 31 to the tip surface 33. In addition, the tip surface 33 has an outer distance (first outer distance) Lo from the rotation axis 32*x* on the outer surface (first outer surface) 34 to the tip surface 33. The tip surface 33 is inclined with respect to a virtual plane vp perpendicular to the extension direction of the first arm 3 so that the inner distance Li is shorter than the outer distance Lo.

Furthermore, as shown in the cross-section of FIG. 7B (cross-section along arrow C in FIG. 7A), the inner surface 31 is configured so that both sides in the insertion direction ID are tapered surfaces ts1 and ts2 that are inclined symmetrically with respect to the insertion direction ID. With this configuration, the finger F is prevented from getting caught on the inner surface 31, and the insertion and removal of the finger F into and from the wearing space FS is smoothly guided.

Figure 8:
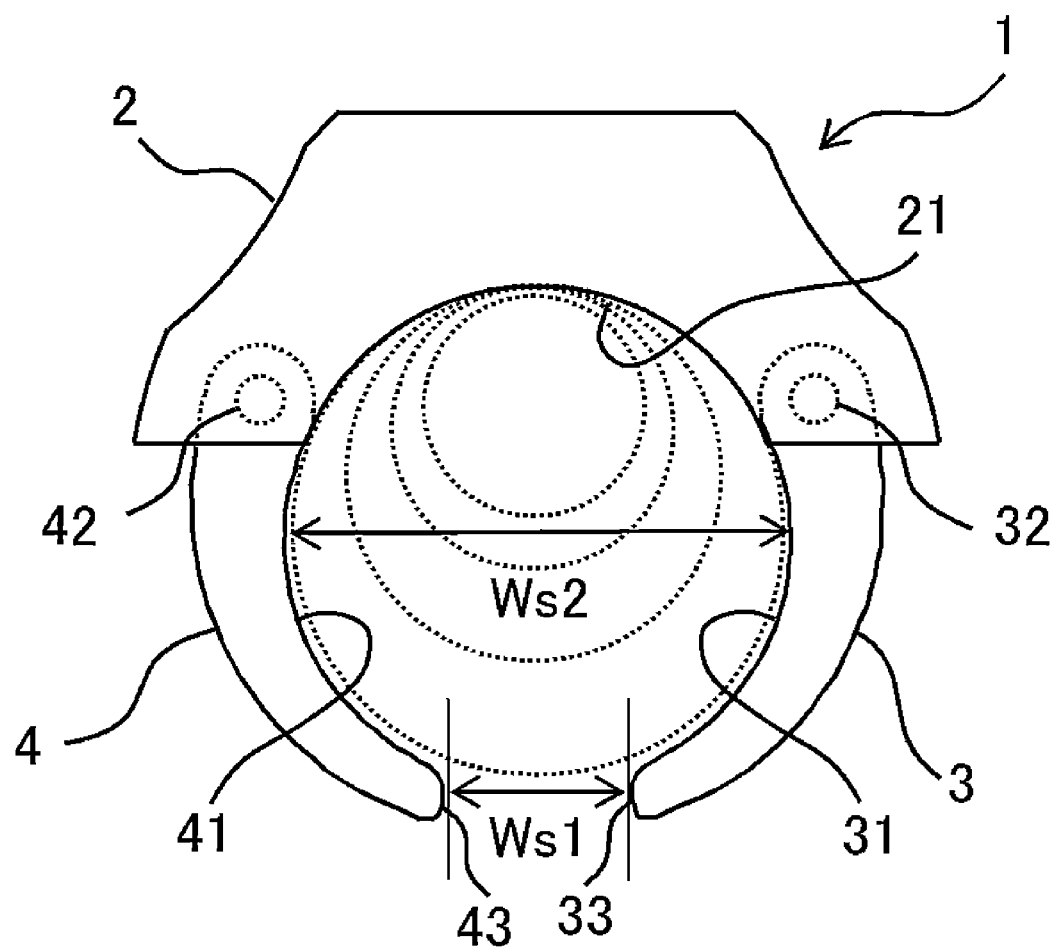
FIG. 8 is a schematic diagram showing the configuration of the ring-type device 1.

As shown in FIG. 8, the lengths of the first arm 3 and the second arm 4 from the main body 2 are preferably set so that the ring-type device 1 does not slip off the finger F4 when the thickest finger F4 on which the wearing is allowed is inserted. For example, the gap Ws1 between the tip surface 33 and the tip surface 43 of each arm when the first arm 3 and the second arm 4 are opened to insert the thickest finger F4 may be set to half or less of the distance Ws2 corresponding to the maximum diameter of the thickest finger F4. In this way, it is possible to prevent the ring-type device 1 from slipping off the finger when used by a user with a thick finger F.

Figure 9:
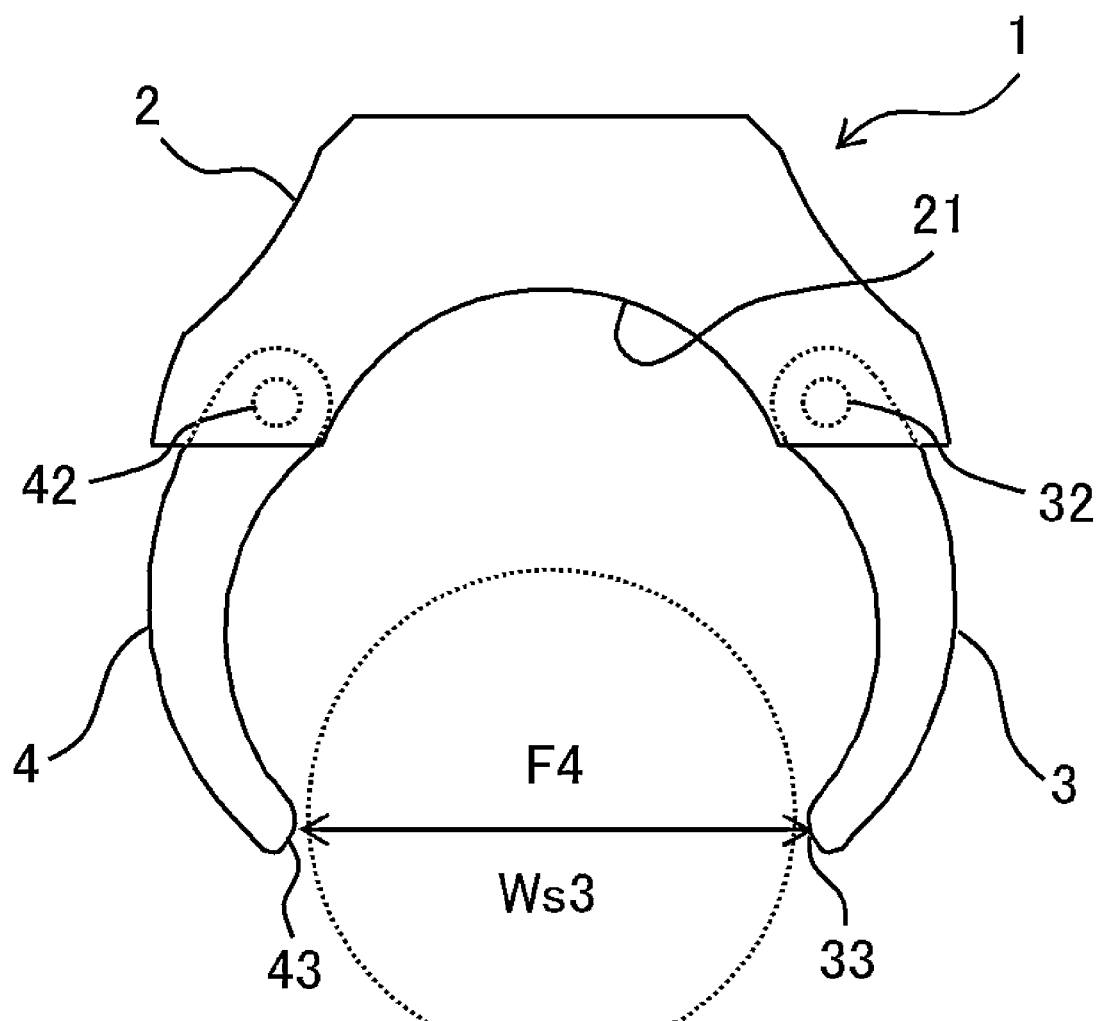
FIG. 9 is a schematic diagram showing the configuration of the ring-type device 1.

As shown in FIG. 9, it is preferable to set the gap Ws3 between the tip surface 33 and the tip surface 43 of each arm when the first arm 3 and the second arm 4 are opened to the movable limit to be slightly larger than the maximum diameter of the corresponding thickest finger F4. With this configuration, when removing the ring-type device 1 from the thickest finger F4, it is possible to remove the ring-type device 1 in a direction perpendicular to the insertion direction ID.

In addition, in the present embodiment, the lengths of the first arm 3 and the second arm 4 from the main body 2 are approximately the same, but they may be different.

Figure 10:
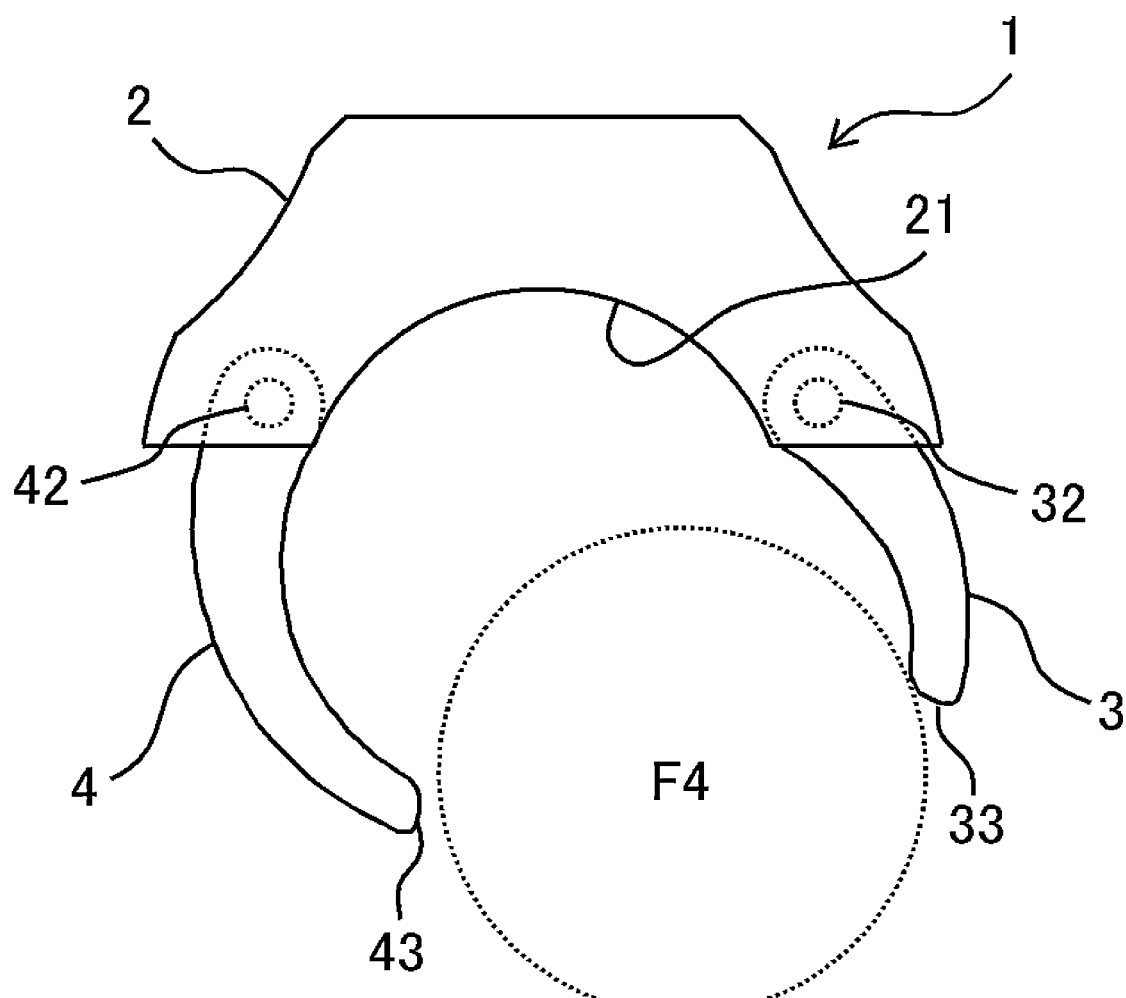
FIG. 10 is a schematic diagram showing a modified configuration of the ring-type device 1.

As shown in FIG. 10, for example, the length of the first arm 3 is made shorter than the length of the second arm 4, and the rotatable range (maximum opening angle) of the first arm 3 relative to the main body 2 is made larger than that of the second arm 4. In this way, the movement direction of the finger F can be guided to the weak side of the biasing force when the finger F is removed from the wearing space FS, and the second arm 4 can be controlled to close before the first arm 3. At this time, it is preferable to provide a tapered surface on the outer surface side of the tip of the second arm 4, which closes first and comes to the inner side with respect to the wearing space FS. Due to the action of this tapered surface, the second arm 4 can easily enter the inner side when the tip of the second arm 4 collides with the tip of the first arm 3.

Figure 11:
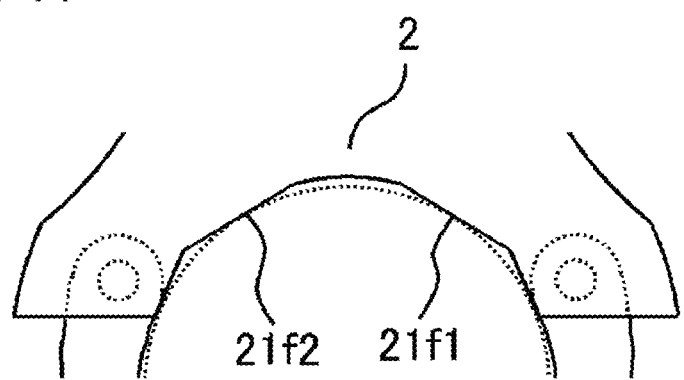
FIG. 11 is a schematic diagram showing a modified configuration of the ring-type device 1.

As shown in FIG. 11, the inner surface 21 of the main body 2 may be a concave surface in which a plurality of planes 21/1 and 21/2 are connected at gradually changing angles. In the above-mentioned embodiment, the inner surface 21 of the main body 2, the inner surface 31 of the first arm 3, and the inner surface 41 of the second arm 4 are each formed of a concave curved surface with a curvature corresponding to the maximum diameter of the thickest finger F4, but the present invention is not limited to such a configuration. As shown in FIG. 11, a concave surface may be formed by planes 21/1 and 21/2 including a tangent to a virtual circle (virtual cylindrical surface) corresponding to the maximum diameter of the thickest finger F4.

Figure 12:
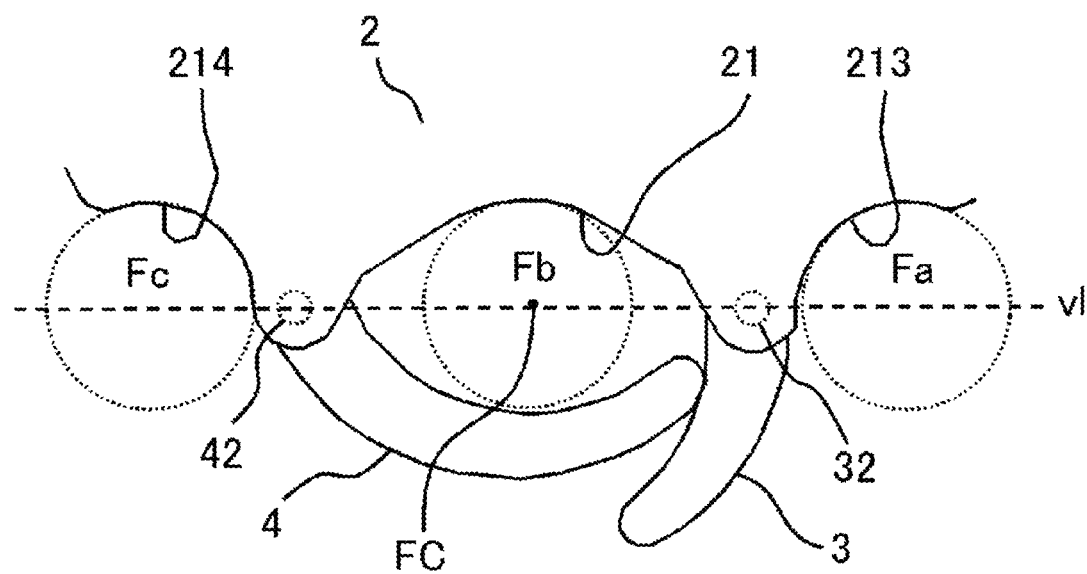
FIG. 12 is a schematic diagram showing a modified configuration of the ring-type device 1.

As shown in FIG. 12, it is preferable to configure the center FC of the virtual circle corresponding to the smallest-diameter finger Fb contained in the wearing space FS to be located on the imaginary line v1 passing through the rotation center of the first arm 3 and the rotation center of the second arm 4, or to be located closer to the main body 2 than the imaginary line v1. Furthermore, it is preferable to provide a third finger rest 213 and a fourth finger rest 214 on which the fingers Fa and Fc on both sides of the finger Fb can be placed on the outer sides of the first arm 3 and the second arm 4, respectively. According to this configuration, in the third wearing mode shown in FIG. 4C, the first arm 3 and the second arm 4 are prevented from interfering with the gripping of the fingers.

Figure 13:
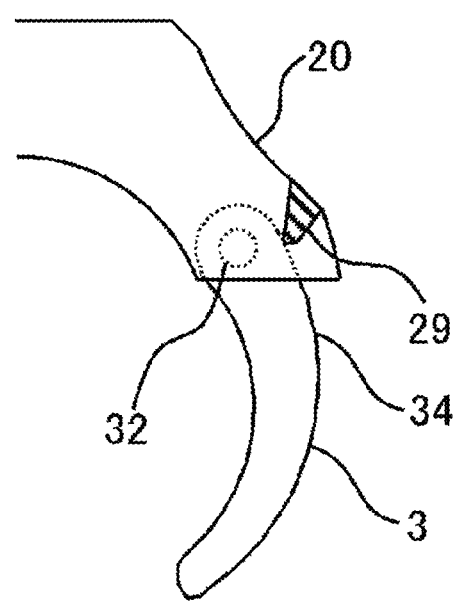
FIG. 13 is a schematic diagram showing the configuration of the ring-type device 1.

As shown in FIG. 13, a restricting portion 29 is provided on the inner side of the cladding 20 of the main body 2. The restricting portion 29 is provided so as to be able to come into contact with the outer surface 34 around the rotation shaft 32 of the first arm 3 in order to restrict the maximum rotation angle (rotation range) of the first arm 3. The cladding 20 is a member that requires strength in the device configuration, and is configured to provide the restricting portion 29 that restricts the rotation of the first arm 3 as a part of the cladding 20. By improving the device strength and suppressing the occurrence of breakage during long-term use, it is possible to extend the life of the device. Such a rotation restricting configuration is also provided for the second arm 4. The rotator restriction range may be the same for the first arm 3 and the second arm 4, or may be different.

Details of Ring-Type Device (Arrangement of Vibration Elements)

Figure 15A:
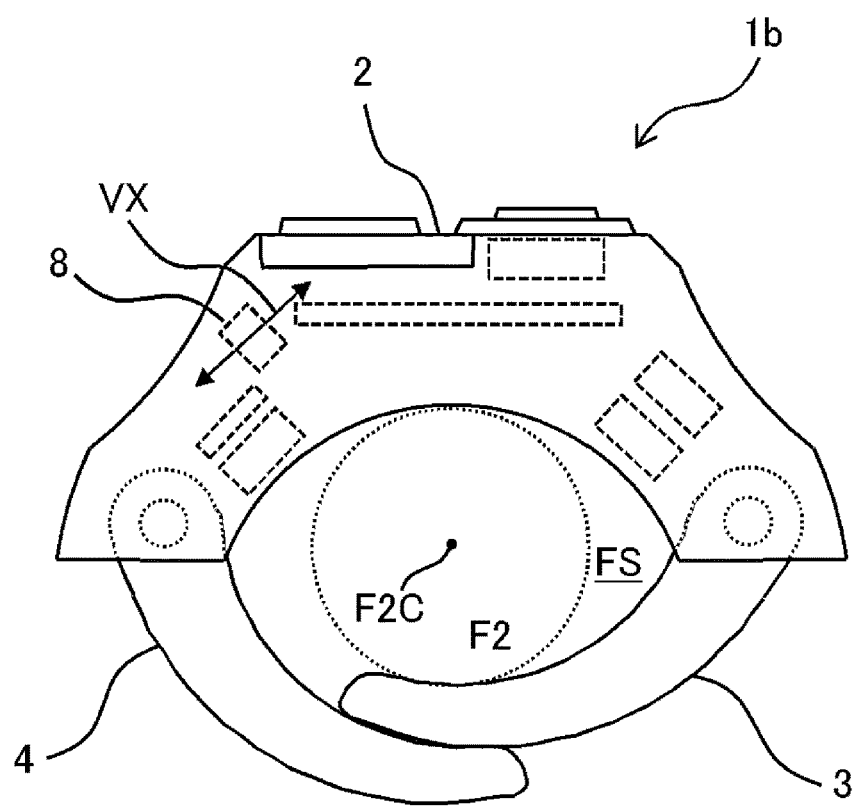
FIGS. 15A and 15B are schematic diagrams showing the configuration of a ring-type device according to a comparative example.
Figure 15B:
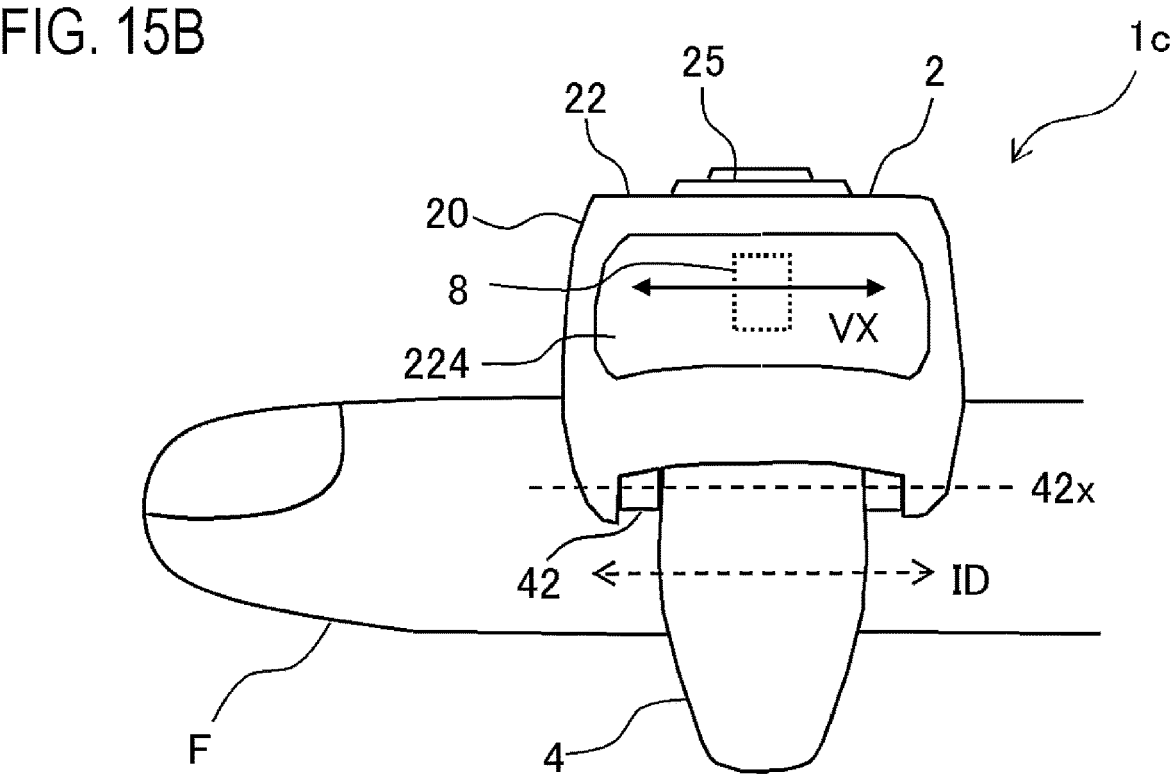
Figure 16A:
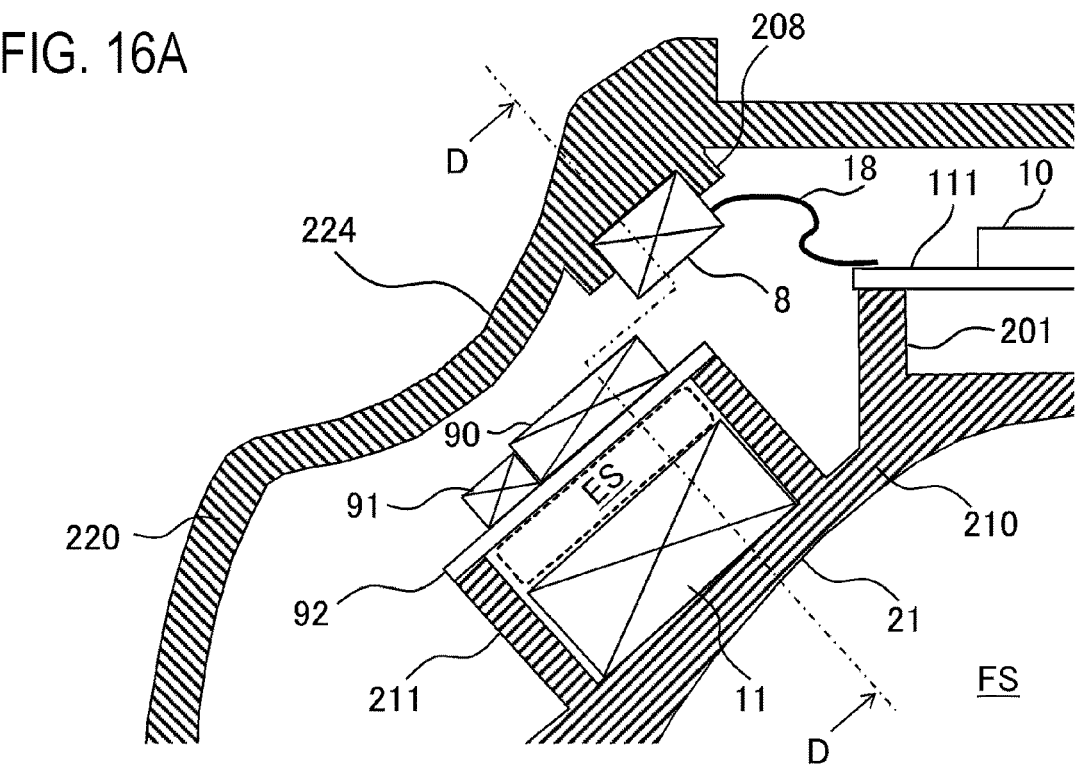
FIGS. 16A to 16C are schematic cross-sectional views showing the configuration of the ring-type device 1.
Figure 16B:
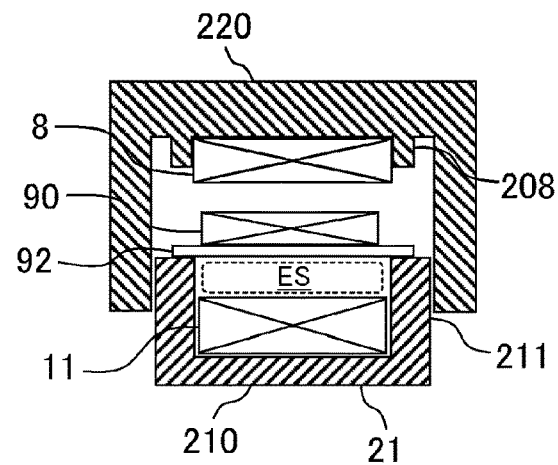
Figure 16C:
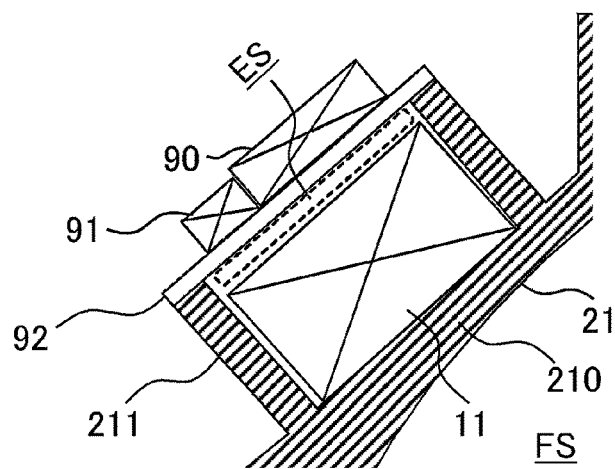
Figure 17:
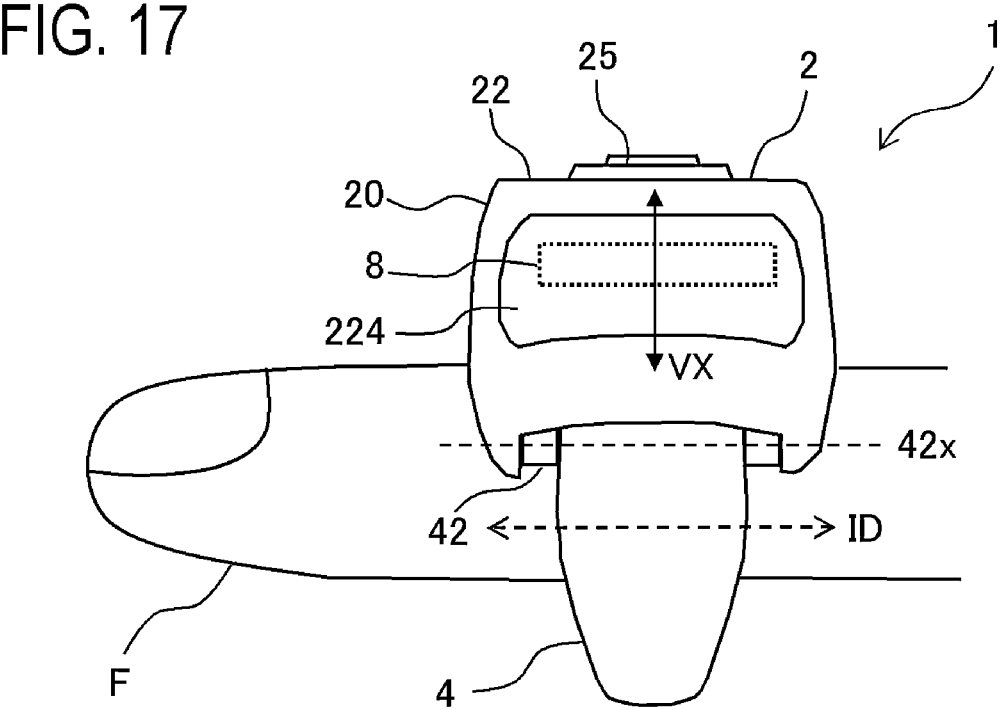
FIG. 17 is a schematic side view showing the configuration of the ring-type device 1.

The arrangement of the vibration element 8 in the ring-type device 1 of the present embodiment will be described in detail with reference to FIGS. 14 to 17. FIG. 14 is a schematic front view of the ring-type device 1 according to the present embodiment illustrating the arrangement of the vibration element 8. FIG. 15A is a schematic front view of a ring-type device 1*b* according to a first comparative example. FIG. 15B is a schematic side view of a ring-type device 1*c* according to a second comparative example. FIG. 16A is a schematic cross-sectional view (cross-section perpendicular to the insertion direction ID) around the vibration element 8 in the ring-type device 1 according to the present embodiment. FIG. 16B is a schematic cross-sectional view taken along arrow D in FIG. 16A. FIG. 16C is a schematic partial cross-sectional view of the ring-type device 1 according to the present embodiment showing the state when the power source 11 is expanded. FIG. 17 is a side view of the ring-type device 1 according to the present embodiment illustrating the arrangement of the vibration element 8.

The way in which the vibration generated by the vibration element 8 is transmitted to the user may vary depending on the arrangement of the vibration element 8 in the ring-type device 1. That is, depending on the position and orientation of the vibration element 8 in the ring-type device 1, the vibration of the vibration element 8 may not be transmitted well to the finger wearing the ring-type device 1, and the user may not be able to have the desired sensory experience. In addition, when the ring-type device is configured so that it can be worn in various ways on the finger, the user's perception of the vibration may differ depending on the way it is worn (for example, when the finger wearing the device is changed).

In addition, the vibration element 8 is a component that consumes a large amount of power among the components mounted on the ring-type device 1, and is required to vibrate efficiently with as little power as possible. It is difficult to mount a large-capacity battery on the ring-type device 1, and it is necessary to transmit the vibration efficiently with a small amount of power. On the other hand, if the vibration does not have a certain magnitude, it may be difficult for the user to sense it.

Furthermore, the arrangement of the vibration element 8 must take the effect of vibration on the operation of other built-in devices into consideration. For example, the ring-type device 1 of the present embodiment is equipped with the inertial sensor 71, and depending on the arrangement of the vibration element 8, vibration may be transmitted to the inertial sensor 71, causing erroneous detection.

Vibration Direction of Vibration Element 8

In the ring-type device 1 of the present embodiment, the vibration element 8 is provided in a predetermined arrangement so that the user wearing the ring-type device 1 can more reliably sense the vibration of the vibration element 8. Specifically, the vibration element 8 is arranged so that its vibration direction is toward the finger inserted into the wearing space FS.

As an arrangement in which the vibration direction of the vibration element 8 is toward the finger inserted into the wearing space FS, as shown in FIG. 14, an arrangement in which an imaginary line VL passing through the vibration element 8 along the vibration axis VX of the vibration element 8 passes through the wearing space FS can be adopted. That is, the imaginary line VL passes through the inner surface and the outer surface opposite to the inner surface of the annular body that surrounds the wearing space FS, which is constituted by the main body 2, the first arm 3 connected to one end of the main body 2, and the second arm 4 connected to the other end of the main body 2. In the present embodiment, the imaginary line VL passes through the inner surface 21 of the cladding 20 of the main body 2 and the inner surface 31 of the first arm 3 as the inner surfaces of the annular body, and passes through the outer surface 22 of the cladding 20 of the main body 2 and the outer surface opposite to the inner surface 31 of the first arm 3 as the outer surfaces of the annular body. One end of the vibration element 8 in the extension direction of the vibration axis VX is located on the side close to the inner surface 21 of the cladding 20 of the main body 2 as the inner surface of the annular body, and the other end is located on the side close to the outer surface 22 of the cladding 20 of the main body 2 as the outer surface of the annular body.

Fingers of various sizes can be mounted in the wearing space FS. The size of a finger may vary greatly depending on the person and even on the part of the finger. In order to accommodate different finger sizes, for example, if a different member such as a replacement member for each finger size is used to fill the gap between the device and the finger, the wearing operation becomes complicated and the number of parts increases. In addition, for example, in a configuration in which an elastic member such as a rubber belt is provided to follow the finger size (finger diameter), the fit (wearing stability) may differ depending on the finger size or the wearing position on the same finger. In other words, regardless of the difference in finger size, a ring-type device is required to be stable and operable during wearing. Therefore, it is preferable to arrange the vibration element 8 so that the vibration of the vibration element 8 is reliably sensed by the user regardless of the size of the finger mounted. Therefore, in the present embodiment, the imaginary line VL is arranged to pass through the center F2C of a virtual circular cross-section corresponding to the finger F2 as a reference center position of the finger inserted into the wearing space FS. In the present embodiment, the center F2C is used as the center position that allows the user to sense the vibration of the vibration element 8 even when a finger F1 smaller than the finger F2 is mounted, or when a finger F3 or F4 larger than the finger F2 is mounted.

The reference center position of the wearing space FS for determining the vibration direction of the vibration element 8 is not limited to the center F2C described above, and may be determined appropriately depending on the configuration of the device. For example, the center position of the virtual circular cross-section corresponding to a finger of an average size in the range of finger sizes that can be inserted into the wearing space FS may be used as the reference center position for determining the vibration direction of the vibration element 8. Alternatively, for example, the center of curvature of a concave arc surface that constitutes the inner surface 21 may be used as the reference center position.

In addition, it is preferable to arrange the vibration element 8 so that the above-mentioned imaginary line VL passes near the deepest part of the concave inner surface 21. The deepest part of the inner surface 21 can be the part where fingers F1 to F4 of all sizes come into contact with the cladding 20, as shown in FIG. 1A. By configuring the vibration of the vibration element 8 to be directly transmitted to such a part, it is possible to make the user easily sense the vibration of the vibration element 8 regardless of the size of the finger inserted into the wearing space FS.

Here, in the present embodiment, the vibration element 8 is a so-called linear vibration actuator. That is, the vibration element 8 is equipped with a mover that is equipped with a magnet and supported by a shaft and a spring so as to be able to reciprocate in a predetermined axial direction, and a coil to which a current can be applied from the outside. The mover is integrally provided with a weight, and reciprocates in a predetermined axial direction (vibration axis direction) along the shaft against the biasing force of the spring due to the excitation of the coil by application of a current and the magnetic force of the magnet provided in the mover. The reciprocating movement of this mover generates vibration in a predetermined vibration direction in the vibration element 8. In the vibration element 8 of the present embodiment, for example, an axis passing through the center of the mover parallel to the axial direction of the shaft may be set as the vibration axis VX, and the direction along the vibration axis VX may be set as the vibration direction of the vibration element 8.

The ring-type device 1 of the present embodiment can be used in a wearing mode in which it is held between a finger inserted into the wearing space FS and another finger, as shown in FIGS. 4A to 4C. Therefore, by generating vibration of the vibration element 8 along the finger touching the ring-type device 1 (particularly the cladding 20) and the arrangement of the fingers, it is possible to make the vibration more easily sensed by the user. Therefore, for example, it is preferable to arrange the vibration element 8 so that the above-mentioned imaginary line VL passes through at least one of the first finger rest 223 and the second finger rest 224 of the cladding 20.

In the present embodiment, as shown in FIG. 14, the vibration element 8 (or the second finger rest 224) is arranged so that the imaginary line VL passes through the second finger rest 224. As a result, the vibration element 8 can be located between the finger F2 inserted into the wearing space FS and the finger Fn placed on the second finger rest 224, and can efficiently and effectively transmit vibration to each of the finger F2 and the finger Fn.

More preferably, the vibration element 8 is arranged so that the imaginary line VL passes through the region of the inner surface 21 that is particularly in contact with the finger inserted into the wearing space FS and the region of the second finger rest 224 that is particularly in contact with the finger placed on the second finger rest 224. The concave shape of the inner surface 21 and the outer circumferential shape of the finger inserted into the wearing space FS usually do not completely match, and the outer circumference of the finger does not necessarily contact the entire region of the inner surface 21. Similarly, the concave shape of the second finger rest 224 and the outer circumferential shape of the finger placed on the second finger rest 224 usually do not completely match, and the outer circumference of the finger does not necessarily contact the entire region of the second finger rest 224. Therefore, for example, by arranging the vibration element 8 so that the imaginary line VL passes through the above-mentioned region of the inner surface 21 and passes through the center of the finger inserted into the wearing space FS, it is possible to efficiently and effectively transmit vibration to the finger inserted into the wearing space FS. Similarly, by arranging the vibration element 8 so that the imaginary line VL passes through the above-mentioned region of the second finger rest 224 and passes through the center of the finger placed on the second finger rest 224, it is possible to efficiently and effectively transmit vibration to the finger placed on the second finger rest 224.

In addition to the first and second finger rests 223 and 224, the outer surface 22 of the cladding 20 as the contacting portion that is in contact with a finger different from the finger inserted into the wearing space FS is also provided with the button switch 6 and the touch sensor 5 as operating members. Therefore, for example, in a ring-type device as a modified form of the present embodiment, the vibration element 8 may be arranged so that the above-mentioned imaginary line VL passes through the button switch 6 and the touch sensor 5. In addition, the touch sensor 5 may be disposed at a position that is out of the above-mentioned imaginary line VL that passes through the vibration element 8, if there is a concern that an erroneous operation may occur due to the vibration of the vibration element 8. In the present embodiment, as described later, the touch sensor 5 is disposed at a predetermined distance from the vibration element 8 in the circumferential direction around the center F2C of the virtual circle corresponding to the finger F2 as the center of the wearing space FS.

The ring-type device 1b according to the first comparative example shown in FIG. 15A has a different arrangement of the vibration element 8 from the ring-type device 1 according to the present embodiment. Specifically, in the ring-type device 1b, the vibration axis VX of the vibration element 8 is perpendicular to the vibration axis VX of the vibration element 8 in the ring-type device 1, and perpendicular to the insertion direction ID of the finger into the wearing space FS. Therefore, in the first comparative example, the imaginary line VL that passes through the vibration element 8 along the vibration axis VX does not pass through the wearing space FS, and there is a concern that the vibration of the vibration element 8 is not sufficiently transmitted to the finger wearing the ring-type device 1b.

In addition, in the first comparative example, the vibration direction of the vibration element 8 is along the circumferential direction surrounding the finger, so there is a concern that the vibration of the vibration element 8 acts to move the ring-type device 1b and the finger inserted into the wearing space FS in relation to each other in the circumferential direction. That is, there is a concern that the vibration of the vibration element 8 will rotate the ring-type device 1b relative to the finger (the wearing position of the ring-type device 1b may be shifted in the direction around the outer circumference of the finger).

The ring-type device 1c according to the second comparative example shown in FIG. 15B is different from the ring-type device 1 according to the present embodiment in the arrangement of the vibration element 8, as in the ring-type device 1b according to the first comparative example. Specifically, in the ring-type device 1c, the vibration axis VX of the vibration element 8 is perpendicular to the vibration axis VX of the vibration element 8 in the ring-type device 1 according to the present embodiment, and is along the insertion direction ID of the finger into respect to the wearing space FS. Therefore, in the second comparative example, the imaginary line VL passing through the vibration element 8 along the vibration axis VX does not pass through the wearing space FS, and there is a concern that the vibration of the vibration element 8 is not sufficiently transmitted to the finger wearing the ring-type device 1c.

In addition, in the second comparative example, since the vibration direction of the vibration element 8 is along the insertion direction ID of the finger into the wearing space FS, there is a concern that the vibration of the vibration element 8 acts to move the ring-type device 1b and the finger inserted into the wearing space FS in relation to each other in the insertion direction ID. That is, there is a concern that the vibration of the vibration element 8 may move the ring-type device 1c relative to the finger in the insertion direction ID (the wearing position of the ring-type device 1b relative to the finger may be shifted in the insertion direction ID).

Compared to the first and second comparative examples, the ring-type device 1 according to the present embodiment can effectively transmit the vibration of the vibration element 8 to the finger wearing the ring-type device 1. Furthermore, the ring-type device 1 according to the present embodiment can obtain a stable wearing state without the concern that the vibration of the vibration element 8 may affect the wearing state of the ring-type device 1 on the finger as in the first and second comparative examples.

Arrangement of Vibration Element 8 in Cladding 20

The vibration element 8 is preferably arranged in the vicinity of the portion of the cladding 20 that forms the outer surface 22, on which the first and second finger rests 223 and 224, the button switch 6, and the touch sensor 5 are arranged, so as to be in contact with the portion. By making the vibration strongly transmitted to the outer part of the cladding 20, the vibration is easily transmitted not only to the finger inserted into the wearing space FS but also to other fingers, making it easier for the user to sense the vibration.

As shown in FIGS. 16A and 16B, the cladding 20 includes an inner cladding 210 as a first housing and an outer cladding 220 as a second housing. The inner cladding 210 has an inner surface 21 that forms the wearing space FS. The outer cladding 220 has an outer surface 22 on which the first and second finger rests 223 and 224, the button switch 6, the touch sensor 5, and the like are arranged. The inner cladding 210 and the outer cladding 220 are joined to each other by screws or the like to form, between them, a substantially arc-shaped storage space (the internal space of the cladding 20) that accommodates built-in devices such as the inertial sensor 71, the geomagnetic sensor 72, the vibration element 8, the communication unit 9, the control unit 10, and the power source 11.

The vibration element 8 is mounted on the mounting portion 208 provided on the inner surface of the outer cladding 220 that forms the above-mentioned storage space of the cladding 20. Since the vibration of the vibration element 8 is directly transmitted to the outer cladding 220, the vibration is easily transmitted to the fingers touching the first and second finger rests 223 and 224, the button switch 6, the touch sensor 5, and the like provided on the outer cladding 220.

Meanwhile, the inner surface of the inner cladding 210 that forms the above-mentioned storage space of the cladding 20 is provided with a mounting portion 201 on which the control board 111 having a control IC as the control unit 10 mounted thereon is mounted, and a mounting portion 211 on which the communication unit 9 and the power source 11 are mounted. Although not shown in the figure, the inner surface of the inner cladding 210 is further provided with a mounting portion on which a board having the inertial sensor 71 and the geomagnetic sensor 72 mounted thereon is mounted.

In other words, the vibration element 8 is arranged in the above-mentioned storage space of the cladding 20 separately from other built-in devices (installed away from the board on which the other built-in devices are mounted). The operation of the vibration element 8 (application of current to the coil) is controlled by a control signal from the control unit 10, but the vibration element 8 is provided separately from the board 111 on which the control unit 10 is mounted, and is connected to the board 111 by a flexible cable 18. The vibration element 8 is also separated from other boards mounted on the inner cladding 210 of the cladding 20. In this way, the vibration of the vibration element 8 is prevented from being directly transmitted to various devices provided on the inner cladding 210.

In addition, when the transmission of vibration of the vibration element 8 to the finger inserted into the wearing space FS is important, for example, the mounting portion 208 may be extended to a position close to the inner cladding 210, and the vibration element 8 may be arranged closer to the inner surface 21 than the outer surface 22.

Furthermore, the mounting portion 211 on which the communication unit 9 and the power source 11 are mounted is configured to form a clearance space ES as a shared space for the communication unit 9 and the power source 11. The communication unit 9 includes a wireless module 90, a wireless antenna 91, and a wireless board 92 on which these are mounted. In addition, the power source 11 is a lithium-ion battery in the present embodiment, and is prone to expansion in case of abnormal high temperature, and is provided with, for example, a gas vent valve for venting gas when the battery expands. In order to ensure sensitivity, it is desirable to avoid placing obstacles that may interfere with radio wave reception around the wireless antenna 91 as much as possible, and in particular, to eliminate conductors, and a space for ensuring sensitivity is usually provided around the wireless antenna 91. In addition, the power source 11, which is a lithium-ion battery, requires a space around it to allow expansion in the event of the above-mentioned abnormality.

As shown in FIG. 16A, the mounting portion 211 is configured to support the wireless board 92 and the power source 11 so that the clearance space ES is formed between the wireless board 92 of the communication unit 9 and the power source 11. As shown in FIG. 16C, this clearance space ES provides a space to allow the above-mentioned expansion of the power source 11, and also provides a space around the wireless antenna 91 to ensure sensitivity. That is, the clearance space ES is a space shared by the communication unit 9 and the power source 11, and by sharing the space required for the communication unit 9 and the power source 11, it is possible to reduce the space of the cladding 20 and improve the degree of freedom in the layout of the internal space of the cladding 20.

Furthermore, as shown in FIGS. 14 and 17, the vibration element 8 is arranged so that its longitudinal direction is aligned with the insertion direction ID of the finger F. The vibration element 8 provided in the ring-type device 1 of the present embodiment has a substantially rectangular parallelepiped external shape, and by aligning its longitudinal direction with the insertion direction ID of the finger F, it can be arranged so as not to take up a space in the circumferential direction in the substantially arc-shaped space inside the cladding 20. Therefore, the design freedom can be increased in the design of the shape of the cladding 20 that follows the outer circumference of the finger.

Note that, as shown in FIG. 17, in the present embodiment, the vibration element 8 is arranged so that the extension direction of the vibration axis VX of the vibration element 8 is perpendicular to the insertion direction ID of the finger into the wearing space FS, but it does not necessarily have to be perpendicular. In other words, it may be an intersecting direction having a slight angle with respect to the perpendicular direction as long as the vibration of the vibration element 8 can be sufficiently transmitted to the finger inserted into the wearing space FS or the finger placed on the first and second finger rests 223 and 224 and the like.

Arrangement Relationship and the Like Between Vibration Element 8 and Other Built-in Devices As shown in FIGS. 14 and 16A, in the ring-type device 1 of the present embodiment, the built-in devices such as the communication unit 9, the control unit 10, the power source 11, the inertial sensor 71, and the geomagnetic sensor 72, except for the vibration element 8, are attached to the inner cladding 210. Furthermore, the vibration element 8 and the other built-in devices are arranged at a distance from each other in the circumferential direction around the center F2C of the imaginary circle corresponding to the finger F2, which is the center of the wearing space FS, inside the cladding 20.

As shown in FIG. 14, in the arrangement configuration with a view in the insertion direction ID of the finger, an axis CX is an axis that is parallel to an imaginary line that passes through the rotation center (the rotation axis 32x) of the first arm 3 and the rotation center (the rotation axis 42x) of the second arm 4 and passes through the center F2C as the reference center position. In addition, an axis CY is an axis that is perpendicular to the axis CX and passes through the center F2C. In the coordinate system consisting of the axes CX and CY, the inertial sensor 71, the geomagnetic sensor 72, and the touch sensor 5 are located in the first quadrant, the vibration element 8, the communication unit 9, and the power source 11 are located in the second quadrant, and the control unit 10 is located so as to straddle the first and second quadrants. The communication unit 9, the control unit 10, and the power source 11, which are included in the same second quadrant as the vibration element 8, are arranged at a position that does not overlap the imaginary line VL passing through the vibration element 8 in the circumferential positional relationship around the center F2C (a position that is shifted from the vibration element 8 when viewed in the vibration direction of the vibration element 8).

Note that the region where the first arm 3 and the second arm 4 open and close is around the boundary between the third and fourth quadrants in the coordinate system consisting of the axes CX and CY, and is the opposite region across the axis CX from the region where the various built-in devices including the vibration element 8 are arranged. That is, the first arm 3 and the second arm 4 hold the finger from the side opposite to the vibration element 8, and push the finger from the third and fourth quadrants to the first and second quadrants, that is, toward the main body 2, so that the vibration of the vibration element 8 is easily transmitted to the finger.

As described above, the vibration element 8 in the present embodiment is configured to operate by passing a current through the coil, and there is a concern that the magnetic force and magnetic field generated by the current passing through the coil may affect the operation of other built-in devices. For example, there is a concern that the magnetic force and magnetic field generated by the vibration element 8 may be detected as noise by the inertial sensor 71 and the geomagnetic sensor 72. In addition, the communication unit 9 includes the wireless module 90 and the wireless antenna 91, but the magnetic force and magnetic field generated by the vibration element 8 may also become noise in the wireless antenna 91, and there is a concern that the metal material constituting the vibration element 8 may affect the sensitivity of the wireless antenna 91. Furthermore, as described above, there is a concern that the vibration of the vibration element 8 may cause an erroneous operation of the touch sensor 5.

The geomagnetic sensor 72 is disposed at a distance from the vibration element 8 in the circumferential direction around the center F2C so as to form an angle of at least 60 degrees or more, preferably 90 degrees or more. The separation distance between the geomagnetic sensor 72 and the vibration element 8 may be determined, for example, by the shortest distance between the geomagnetic sensor 72 and the vibration element 8 in the circumferential direction around the center F2C. For example, an imaginary line passing through the center F2C and the part of the geomagnetic sensor 72 that is closest to the vibration element 8 in the circumferential direction is defined as L72. Moreover, an imaginary line passing through the center F2C and the part of the vibration element 8 that is closest to the geomagnetic sensor 72 in the circumferential direction is defined as L8a. The geomagnetic sensor 72 and the vibration element 8 may be disposed so that the angle R1 formed by the imaginary line L72 and the imaginary line L8a around the center F2C falls within the above-mentioned angle range.

The inertial sensor 71, similarly to the geomagnetic sensor 72, is disposed at a distance from the vibration element 8 in the circumferential direction around the center F2C so as to form an angle of at least 60 degrees or more, preferably 90 degrees or more. The separation distance between the inertial sensor 71 and the vibration element 8 may be determined, similarly to the geomagnetic sensor 72, by the shortest distance between the inertial sensor 71 and the vibration element 8 in the circumferential direction around the center F2C. For example, an imaginary line passing through the center F2C and the part of the inertial sensor 71 that is closest to the vibration element 8 in the circumferential direction is defined as L71. Moreover, an imaginary line passing through the center F2C and the part of the vibration element 8 that is closest to the inertial sensor 71 in the circumferential direction is defined as L8a. The inertial sensor 71 and the vibration element 8 may be disposed so that the angle R2 formed by the imaginary line L71 and the imaginary line L8a around the center F2C falls within the above-mentioned angle range.

The communication unit 9 is disposed so that the wireless antenna 91 is separated at a distance from the vibration element 8 in the circumferential direction around the center F2C so as to form an angle of at least 30 degrees or more, preferably 90 degrees or more. The separation distance between the wireless antenna 91 and the vibration element 8 may be determined, for example, by the shortest distance between the wireless antenna 91 and the vibration element 8 in the circumferential direction around the center F2C. For example, an imaginary line passing through the center F2C and the part of the wireless antenna 91 that is closest to the vibration element 8 in the circumferential direction is defined as L91. Moreover, an imaginary line passing through the center F2C and the part of the vibration element 8 that is closest to the wireless antenna 91 in the circumferential direction is defined as L8b. The wireless antenna 91 (communication unit 9) and the vibration element 8 may be disposed so that the angle R3 formed by the imaginary line L91 and the imaginary line L8b around the center F2C falls within the above-mentioned angle range.

The touch sensor 5 is disposed at a distance from the vibration element 8 in the circumferential direction around the center F2C so as to form an angle of at least 30 degrees or more, preferably 90 degrees or more. The separation distance between the touch sensor 5 and the vibration element 8 may be determined, for example, by the shortest distance between the touch sensor 5 and the vibration element 8 in the circumferential direction around the center F2C. For example, an imaginary line passing through the center F2C and the part of the touch sensor 5 that is closest to the vibration element 8 in the circumferential direction is defined as L5. Moreover, an imaginary line passing through the center F2C and the part of the vibration element 8 that is closest to the touch sensor 5 in the circumferential direction is defined as L8a. The touch sensor 5 and the vibration element 8 may be disposed so that the angle R4 formed by the imaginary line L5 and the imaginary line L8a around the center F2C falls within the above-mentioned angle range.

Here, the center position of the wearing space FS for determining the circumferential separation distance between the vibration element 8 and the other built-in devices, the touch sensor 5, and the like is not limited to the center F2C described above, and may be determined appropriately according to the configuration of the device. For example, the center position of the virtual circular cross-section corresponding to a finger with an average size in the size range of fingers that can be inserted into the wearing space FS may be used as a reference. Alternatively, for example, the center of curvature of the concave arc surface that constitutes the inner surface 21 may be used as a reference.

In addition, in the present embodiment, an example in which a so-called linear vibration actuator is used as the vibration element 8 has been described, but other vibration actuators may be used as the vibration element 8. For example, a vibration actuator using a piezoelectric element or a vibration actuator using an eccentric motor may be used.

Details of Ring-Type Device (Configuration Around Operating Portion)

The configuration for improving operability in the ring-type device 1 of the present embodiment will be described with reference to FIGS. 18 to 25B.

Figure 18:
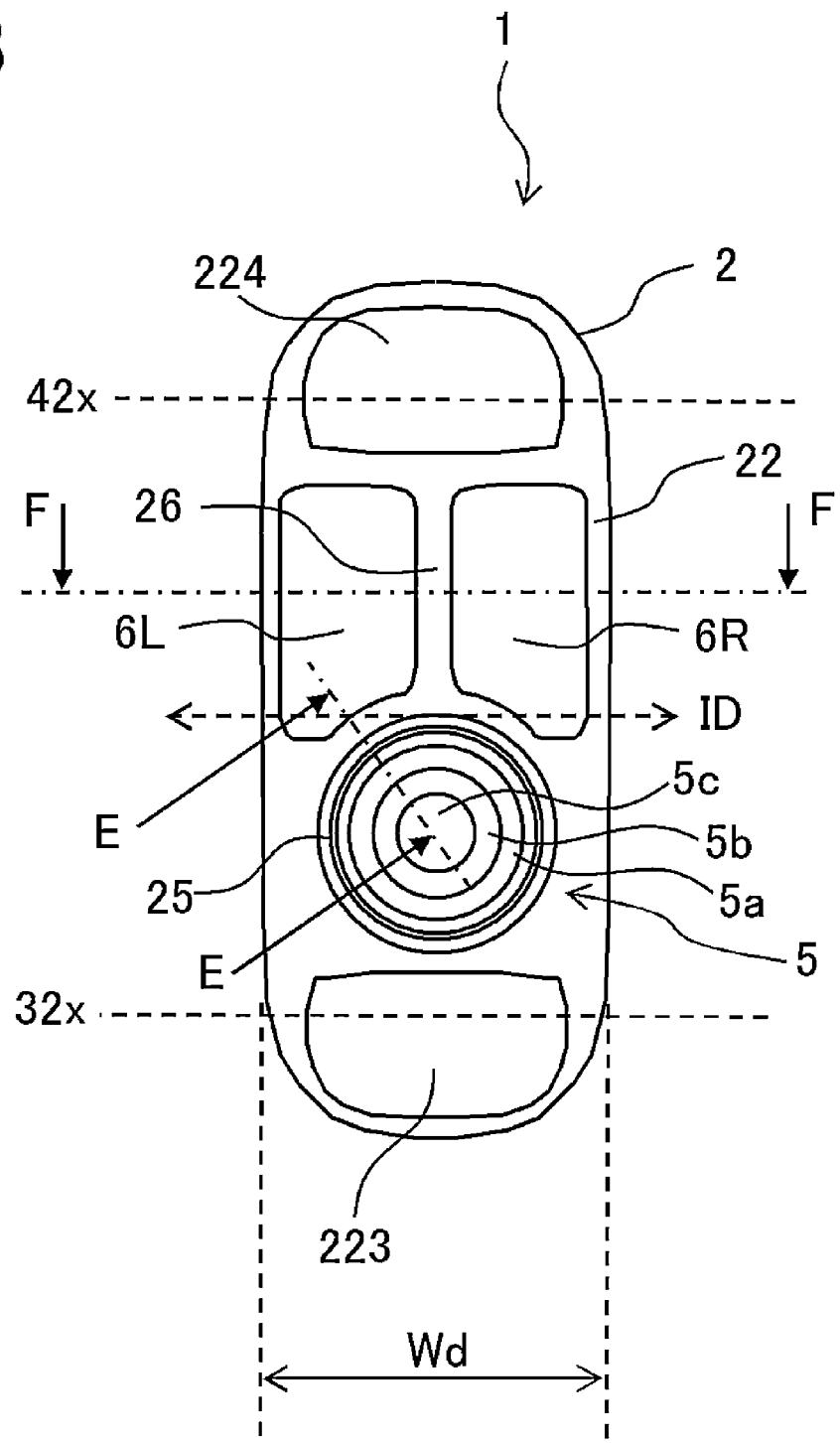
FIG. 18 is a schematic diagram showing the configuration of the operating surface of the ring-type device 1.

FIG. 18 is a top view showing the configuration of the operating surface of the ring-type device 1. As shown in FIG. 18, the ring-type device 1 of the present embodiment has an operating surface on the outer surface 22 of the cladding 20 of the main body 2, which is provided with the touch sensor 5 and the button switches 6R and 6L as operating portions. The ring-type device 1 is expected to be used in such a way that the user performs various input operations without looking at the hand wearing the ring-type device 1. That is, the user grasps and identifies the touch sensor 5 and the button switches 6R and 6L by relying on the feeling of the finger touching the operating surface, and performs a desired input operation. Therefore, the ring-type device 1 is required to be able to reliably grasp the positions of the touch sensor 5 and the button switches 6R and 6L without looking at the operating surface, and to be able to smoothly operate the touch sensor 5 and the button switches 6R and 6L without erroneous operations.

Here, the touch sensor 5 and the button switches 6R and 6L on the operating surface are arranged such that the touch sensor 5 is arranged on the wrist side of the hand wearing the ring-type device 1, and the button switches 6R and 6L are arranged on the fingertip side, as shown in FIGS. 4A to 4C. That is, the touch sensor 5 is disposed on the front side in the circumferential direction around the finger insertion direction with respect to the finger inserted into the wearing space FS, and the button switches 6R and 6L are disposed on the back side. In an operation mode normally assumed, a finger other than the thumb (typically the index finger or middle finger) is inserted into the wearing space FS, and the touch sensor 5 and the button switches 6R and 6L are operated by the thumb extended from the front side to the back side of the touch sensor 5. Note that although FIGS. 4A to 4C show a case where the ring-type device 1 is worn on the right hand, the ring-type device 1 may be worn on the left hand.

The first finger rest 223 is a finger rest (first recess) disposed on the front side of the cladding 20 of the main body 2. For example, when the touch sensor 5 and the button switches 6R and 6L are not operated, the thumb can be placed on the first finger rest 223. The second finger rest 224 is a finger rest (second recess) disposed on the back side of the cladding 20 of the main body 2. For example, as shown in FIG. 4B, in a wearing mode in which the middle finger is inserted into the wearing space FS, the index finger can be placed on the second finger rest 224. This allows the ring-type device 1 to be held in a state in which a part of the ring-type device 1 is wrapped in the palm and the index finger presses the main body 2, thereby stabilizing the wearing posture of the ring-type device 1. In addition, the first finger rest 223 and the second finger rest 224 provide a place for the fingers to retreat when not in operation, which prevents the fingers from unintentionally touching the operating portion, leading to the prevention of erroneous operations.

In addition, in the ring-type device 1 of the present embodiment, the width Wd of the main body 2 shown in FIG. 18 (the width of the main body 2 in the insertion direction ID of the finger into the wearing space FS) is set to about 25.0 mm. This setting corresponds to the joint spacing of the finger inserted into the wearing space FS, or the width of the thumb that operates the touch sensor 5 and the button switches 6R and 6L.

In the ring-type device 1 of the present embodiment, the touch sensor 5 and the button switches 6R and 6L are configured with a predetermined size, shape, and arrangement, and a first boundary identification rib 25 and a second boundary identification rib 26, which will be described later, are arranged on the premise that the device is operated by the thumb. Since the thumb is the widest finger on the human hand, the touch sensor 5 and the button switches 6R and 6L, which are the operating portions, are required to be easily pressed separately although it is not possible to provide them with a sufficient size.

Boundary Identification Rib

As shown in FIG. 18 and other figures, the ring-type device 1 of the present embodiment has a first boundary identification rib 25 and a second boundary identification rib 26 as a configuration for allowing the user to recognize the distinction and arrangement of the touch sensor 5 and the button switches 6R and 6L only by the feeling of the finger touching the operating surface. The first boundary identification rib 25 as the first rib and the second boundary identification rib 26 as the second rib are configured as part of the cladding 20. Furthermore, the shapes and arrangements of the touch sensor 5 and the button switches 6R and 6L as the operating portions are also configured to be suitable for operation only by the tactile sense of the finger.

The first boundary identification rib 25 is an annular rib arranged to surround the outer circumference of the touch sensor 5. The first boundary identification rib 25 allows the user to recognize that the touch sensor 5 is located inside by making the finger feel the annular convex shape. In the present embodiment, the touch sensor 5 has a shape that protrudes higher than the first boundary identification rib 25. Therefore, the user can recognize that a convex-shaped part protruding further from the annular convex shape is the touch sensor 5 by feeling with his/her finger that the convex-shaped part is inside the annular convex shape.

In addition, a part of the annular first boundary identification rib 25 is disposed between the touch sensor 5 and the button switches 6R and 6L. Therefore, the positional relationship between the first boundary identification rib 25 and the second boundary identification rib 26 described later allows the user to recognize the boundary between the touch sensor 5 as the first operating portion and the button switches 6R and 6L as the second operating portion.

The second boundary identification rib 26 is provided so as to extend in the circumferential direction on the outer surface 22 of the cladding 20 of the main body 2 between the button switches 6R and 6L aligned in the insertion direction ID of the finger into the wearing space FS of the ring-type device 1. The second boundary identification rib 26 protrudes higher than the upper surfaces of the button switches 6R and 6L. Therefore, by touching the convex shape extending in the circumferential direction of the finger (around the insertion direction of the finger) inserted into the wearing space FS with the finger, the user can recognize that the lower parts adjacent to both sides of the convex shape in the insertion direction ID of the finger are the button switches 6R and 6L. That is, the second boundary identification rib 26 allows the user to recognize the boundary between the button switch 6R as the first operating portion and the button switch 6L as the second operating portion.

In addition, in the present embodiment, the first boundary identification rib 25 is arranged on the front side of the second boundary identification rib 26 in the circumferential direction of the finger, and the pair of button switches 6R and 6L are arranged so as to be symmetrical with respect to the second boundary identification rib 26 in the insertion direction ID of the finger. It can be said that these configurations arranged around the second boundary identification rib 26 have the function of giving the user the certainty that the convex shape extending in the circumferential direction felt with the finger is the second boundary identification rib 26.

In other words, the annular convex shape of the first boundary identification rib 25 is a characteristic shape that is easily recognized by the touch of the finger alone, and is a shape that is easy for the user to recognize. By making the user feel with his/her finger that a convex shape extending in the circumferential direction is present on the back side of the finger in the circumferential direction of the annular convex shape, the user can confidently recognize that the convex shape in the circumferential direction is the second boundary identification rib 26.

Furthermore, by making the user feel that the convex shape extending in the circumferential direction of the finger is symmetrical on both sides of the insertion direction ID of the finger, the user can confidently recognize that the convex shape in the circumferential direction is the second boundary identification rib 26. Furthermore, the user can confidently recognize that the right side of the symmetrical shapes on both sides in the insertion direction ID of the finger, of the convex shape in the circumferential direction is the button switch 6R and the left side is the button switch 6L.

Dimensional Relationship and the Like of First Boundary Identification Rib 25

FIG. 19 is a schematic cross-sectional view taken along arrow E in FIG. 18, showing the height relationship of the touch sensor 5, the button switches 6R and 6L, the first boundary identification rib 25, and the like. As shown in FIG. 19, the height H5 of the touch sensor 5 is higher than the height H25 of the first boundary identification rib 25. The height H6 of the button switches 6L and 6R is equal to or higher than the height H22 of the outer surface 22 of the cladding 20 of the main body 2. The height H25 of the first boundary identification rib 25 is equal to or higher than the height H6 of the button switches 6L and 6R. In other words, the heights of the outer surface 22 of the cladding 20 of the main body 2, the touch sensor 5, the button switches 6R and 6L, and the first boundary identification rib 25 are configured to satisfy the relationship H22≤H6≤H25<H5.

Here, the difference in height (H25–H6) of the first boundary identification rib 25 with respect to the button switches 6L and 6R is configured to be 0.3 mm or more in the present embodiment. In addition, the width W25 of the first boundary identification rib 25 (the difference between the inner diameter and the outer diameter of the first boundary identification rib 25) is configured to be 1.5 mm or more in the present embodiment.

The height H25 and width W25 of the first boundary identification rib 25 are set from the viewpoint of preventing erroneous operations during blind operations. If the height H25 is too low or the width W25 is too narrow, it may be difficult to identify the first boundary identification rib 25. Conversely, if the height H25 is too high or the width W25 is too wide, it may hinder the operation of the touch sensor 5. The above-mentioned numerical ranges of each dimension are merely examples, and may be appropriately set to suitable numerical values from the viewpoint of operability depending on the configuration of the device.

The first boundary identification rib 25 is disposed between the button switches 6R and 6L and the touch sensor 5, thereby preventing the touch sensor 5 from being unintentionally operated when the button switches 6R and 6L, which are push buttons, are pressed.

The touch sensor 5 is a so-called optical pointing device, and includes an optical sensor unit 5c having a detection window at the center of a circular upper surface 5b of a button portion 5a. By moving a finger (moving it in a plane) on the optical sensor unit 5c, a pointing operation, a flick operation, and the like can be performed. Note that the touch sensor 5 is not limited to an optical pointing device, and may be, for example, a capacitive pointing device.

The touch sensor 5 is also configured such that the button portion 5a is movable up and down, and an input operation of pressing the circular upper surface 5b of the button portion 5a is also possible. That is, the button portion 5a is provided so that it can move so that the amount of depression in relation to the first boundary identification rib 25 surrounding its outer circumference can change, and an input state can be created by pressing the circular upper surface 5b so as to be depressed inside the annular first boundary identification rib 25. The button portion 5a is biased by a biasing unit such as a spring (not shown) so as to be positioned at a height (home position) protruding from the first boundary identification rib 25 unless a particular external force is applied. The user can perform an input operation by pressing the circular upper surface 5b of the button portion 5a against the biasing force of the biasing unit. When the finger is released and the pressed state (input state) of the button portion 5a is released, the biasing force of the biasing unit causes the button portion 5a to return to a height (home position) protruding from the first boundary identification rib 25.

Here, it is preferable that the height of the circular upper surface 5b of the button portion 5a for creating the input state by a pressing operation is lower than the height of the first boundary identification rib 25. In this way, it is possible to configure the button portion 5a so that it does not easily enter an input state even if the finger touches the button portion 5a while checking the first boundary identification rib 25 with the finger. In other words, it is possible to suppress a malfunction in which the button portion 5a is mistakenly put into an input state.

In addition, an annular surface region of the circular upper surface 5b that surrounds the outer circumference of the optical sensor unit 5c and an inclined region 25b that extends from the base of the first boundary identification rib 25 to the top 25a are disposed between the top 25a of the first boundary identification rib 25 and the optical sensor unit 5c. In this way, a predetermined distance is secured between the top 25a of the first boundary identification rib 25 and the optical sensor unit 5c. In this way, it is also possible to suppress the occurrence of a malfunction in which the operation of the finger checking the first boundary identification rib 25 with the touch is detected as an input to the optical sensor unit 5c.

The outer circumference of the circular upper surface 5b of the button portion 5a is configured to have an inclined surface 5d that expands in diameter in a tapered manner, and a distance is also provided between the top 25a of the first boundary identification rib 25 and the circular upper surface 5b. In this way, it is possible to prevent the movement of a finger to check the feel of the first boundary identification rib 25 from leading to an operation of pressing the button portion 5a of the touch sensor 5. In other words, the occurrence of erroneous operations can be suppressed.

Dimensional Relationship and the Like of Second Boundary Identification Rib 26

Figure 20A:
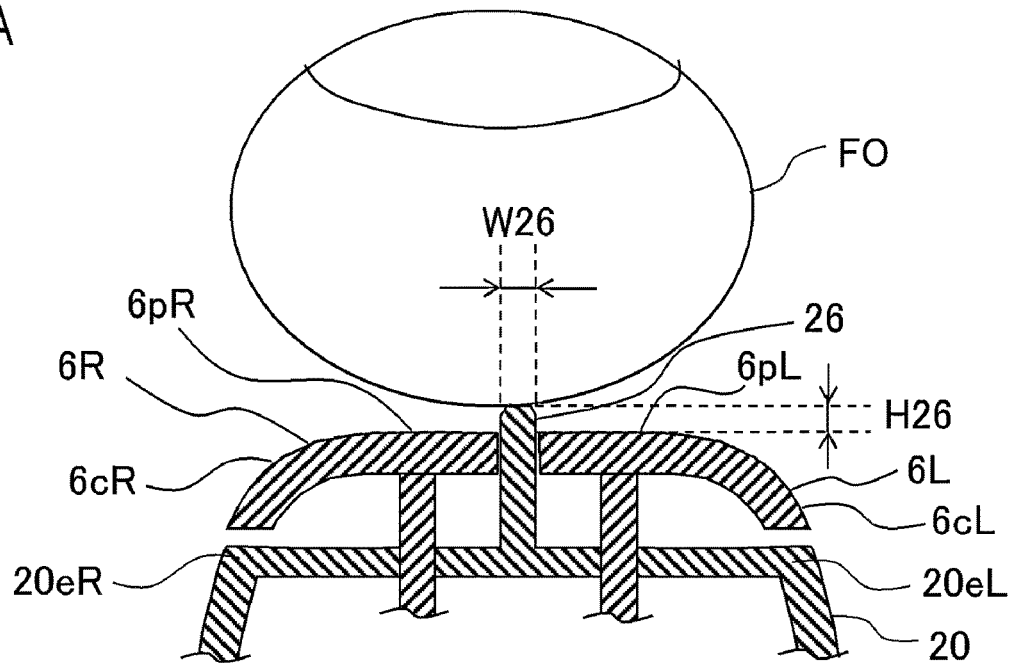
FIGS. 20A and 20B are schematic cross-sectional views taken along arrow F in FIG. 18.
Figure 20B:
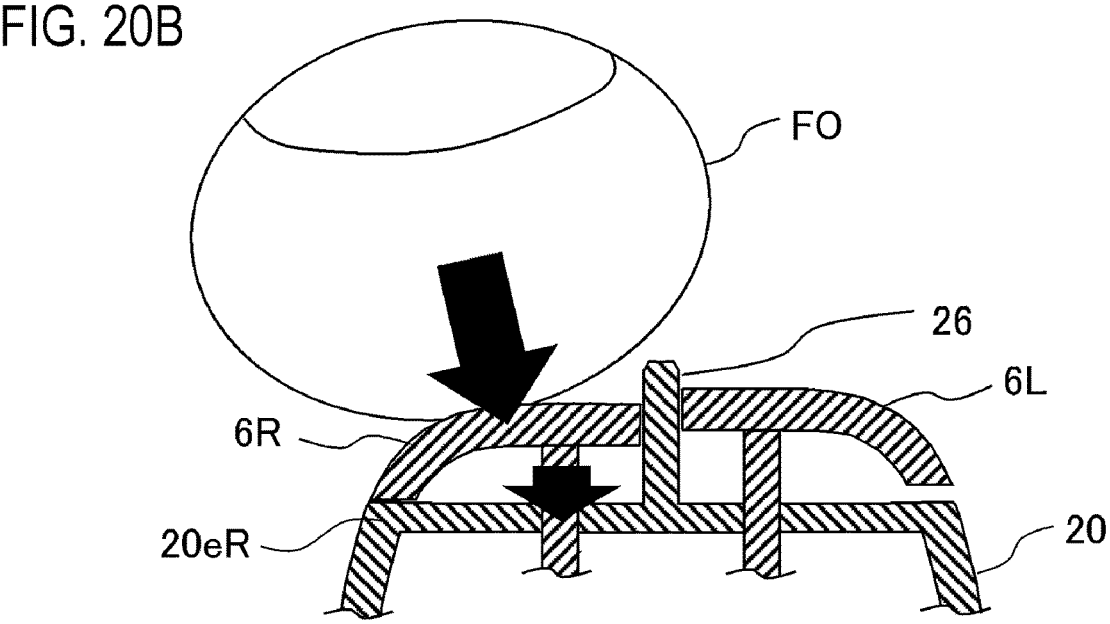

FIGS. 20A and 20B are schematic cross-sectional views taken along arrow F in FIG. 18. As shown in FIGS. 20A and 20B, the second boundary identification rib 26 protrudes outward (upward) from the upper surface of each of the button switches 6R and 6L, and in the present embodiment, the protruding height H26 is configured in the range of at least 0.3 mm and not more than 1.0 mm. In addition, in the present embodiment, the width (width in the insertion direction ID of the finger) W26 of the second boundary identification rib 26 between the button switches 6R and 6L is configured to be in the range of at least 1.0 mm and not more than 2.5 mm.

The protruding height H26 and width W26 of the second boundary identification rib 26 are set from the perspective of preventing erroneous operations during blind operations. If the protruding height H26 is too low or the width W26 is too narrow, it may be difficult to identify the second boundary identification rib 26. Conversely, if the protruding height H26 is too high or the width W26 is too wide, it may hinder the pressing operation of the button switches 6R and 6L. The above-mentioned numerical ranges of each dimension are merely examples, and may be appropriately set to suitable numerical values from the viewpoint of operability according to the configuration of the device.

Here, the button switches 6R and 6L have curved (convex arc-shaped) ends 6cR and 6cL on the outer sides of the flat parts 6pR and 6pL in the insertion direction ID of the finger. The ends 6cR and 6cL are located upstream (radially outward with respect to the reference center of the wearing space FS) in the pressing direction of the button switches 6R and 6L with respect to the corners 20eR and 20eL between the outer circumferential surface and the side surface of the cladding 20 of the main body 2.

In other words, the ends 6cR and 6cL of the button switches 6R and 6L are configured to form part of the corner between the outer circumferential surface and the side surface of the main body 2. With this configuration, a user can press the button switches 6R and 6L as if the user is pressing the corners of a substantially arc-shaped structure including the cladding 20 of the main body 2 and the button switches 6R and 6L. With this configuration, the button switches 6R and 6L can be easily pressed even in a small-sized main body 2. In particular, the corners of the structure have a shape that is easily sensed by the tactile sense of the finger in blind operations, and the pressing operation can be performed by relying on the tactile sense of the corners, thereby improving operability.

Figure 21:
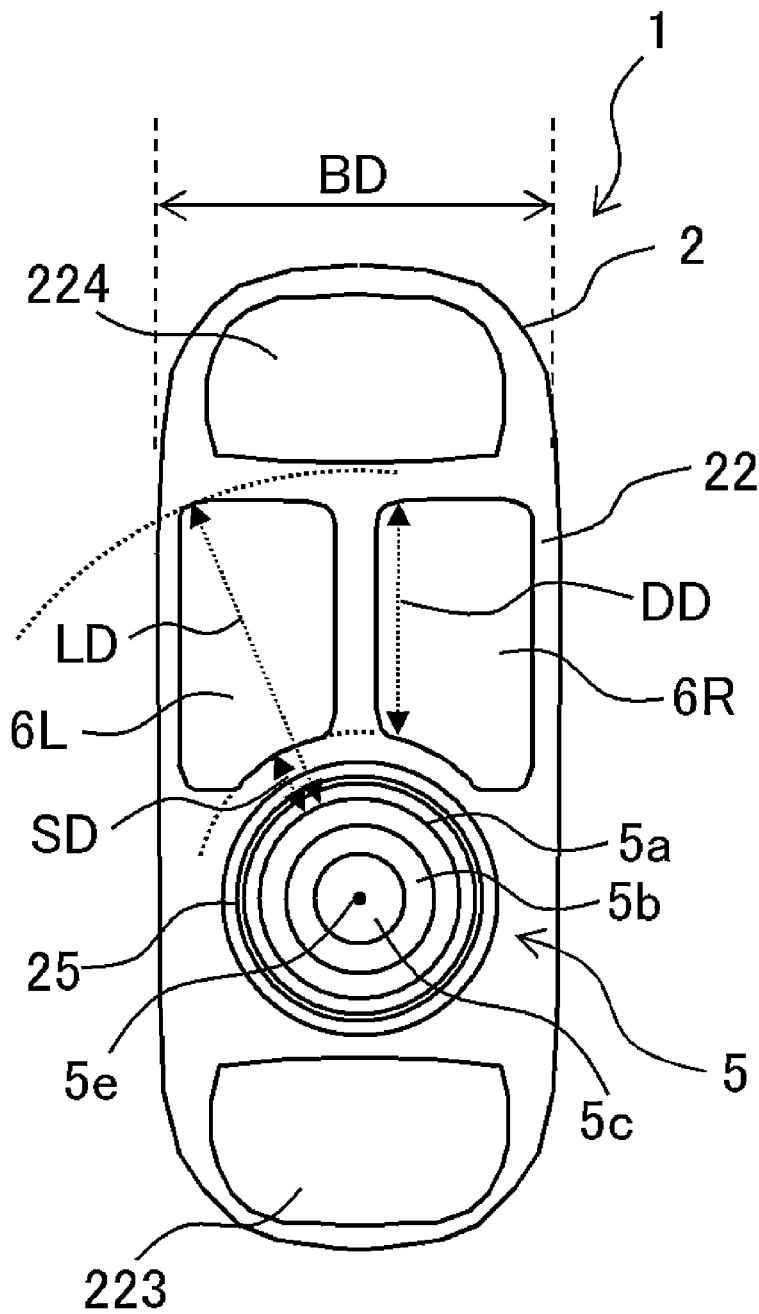
FIG. 21 is a schematic diagram showing the configuration of the operating surface of the ring-type device 1.

In the present embodiment, the ends 6cR and 6cL are ends having a curved surface with respect to the flat parts 6pR and 6pL, but they may be corners formed of a straight surface.
Dimensional Relationship and the Like Between Touch Sensor 5 and the Switches 6R and 6L FIG. 21 is a top view showing the configuration of the operating surface of the ring-type device 1, and is a diagram explaining the shape and arrangement relationship of the touch sensor 5 and the button switches 6R and 6L. The size and arrangement of the button switches 6R and 6L are determined by various dimensions based on the center 5e (the center of the annular shape of the first boundary identification rib 25) of the touch sensor 5 (the optical sensor unit 5c) when the operation surface of the main body 2 is viewed in a plan view.

For example, the combined width BD of the button switches 6R and 6L in the insertion direction ID of the finger is configured to be 25.0 mm or less, preferably 10.0 mm or less. In addition, the shortest distance SD between the touch sensor 5 and the button switches 6R and 6L is configured to be 1.5 mm or more, and the longest distance LD is configured to be 20.0 mm or less. Note that this numerical range is suitable for the ring-type device 1 of the present embodiment. In other words, this numerical range is merely an example, and may be appropriately set so as to minimize the amount of finger movement between the touch sensor 5 and the button switches 6R and 6L and to be within a reasonable range for the amount of finger movement used for operation.

The width DD of the button switches 6R and 6L in the circumferential direction of the main body 2 (direction from the front side to the back side) is configured to be 8.0 mm or more even in the narrowest region. The size and shape of the button switches 6R and 6L are preferably configured so that when used by a person with large fingers, the button switches 6R and 6L can be easily pressed with the pad of the thumb when the finger is inserted up to the base of the finger in the wearing space FS. Note that the above-mentioned numerical range is merely an example, and may be set appropriately depending on the device configuration.

The first finger rest 223 and the second finger rest 224 are configured with a concave curved surface in the present embodiment, but may be configured with a flat surface, and the size of at least one of the width in the insertion direction ID of the finger and the width in the circumferential direction of the main body 2 is configured to be 10.0 mm or more. In particular, it is preferable to set the size and shape of the first finger rest 223 so that it provides a sufficient space for the thumb, which is the largest of the fingers.

Figure 22:
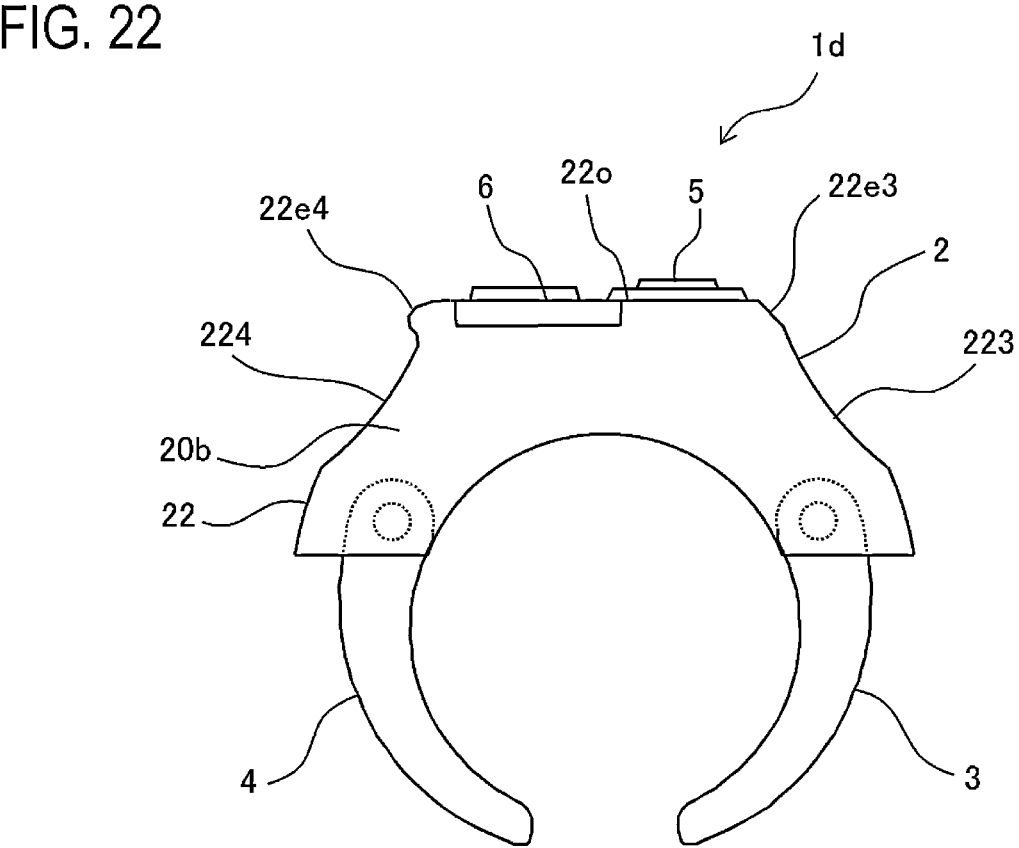
FIG. 22 is a schematic front view of a ring-type device 1*d* according to a modified example.

FIG. 22 is a schematic front view of a ring-type device 1d according to a modified example. The ring-type device 1d is provided with a configuration for preventing the user from wearing the ring-type device 1d with the front side and the back side reversed. Specifically, the ring-type device 1d is provided with a protrusion 22e4 as a configuration for giving the user a sense of strangeness when the ring-type device 1d is worn incorrectly. The protrusion 22e4 is the back end of the operating surface 220 on which the touch sensor 5 and the button switches 6R and 6L are arranged in the circumferential direction of the main body 2 and is provided between the operating surface 220 and the second finger rest 224. The front end of the operating surface 220 on the opposite side, that is, a portion between the operating surface 220 and the first finger rest 223, is configured as a flat portion 22e3. That is, the back end and the front end of the operating surface 220 are configured to be asymmetric in shape.

When the ring-type device 1d is incorrectly worn with the front side and the back side reversed, the thumb is placed on the second finger rest 224, and during operation, the thumb moves back and forth between the second finger rest 224 and the operating surface. Therefore, by providing the protrusion 22e4 that has a shape that prevents the thumb from moving back and forth as described above between the second finger rest 224 and the operating surface, smooth movement of the thumb is hindered when the device is worn normally, making it possible to make the user feel a sense of strangeness. This allows the user to recognize that the device is in an incorrectly worn state.

The configuration that gives the user a sense of strangeness when the device is incorrectly worn is not limited to the protrusion 22e4 described above. For example, the shapes of the first finger rest 223 and the second finger rest 224 may be made different from each other to give the user a sense of strangeness. For example, by configuring the first finger rest 223 in a concave shape and the second finger rest 224 in a flat shape, the thumb placement state, which is stable when worn normally, can give the user a sense of strangeness that the thumb does not fit properly, thereby making the user aware of the incorrect wearing.

It is also assumed that the user may want to wear the ring-type device with the button switches 6R and 6L on the front side and the touch sensor 5 on the back side. That is, there may be quite a few users who wear the ring-type device with the front side and the back side reversed. In such a case, the control unit 10 may be configured to process the input to the touch sensor 5 and the button switches 6R and 6L so that the input signals are inverted vertically and horizontally to meet the needs of the user.
Circumferential Arrangement of Operating Portions With reference to FIGS. 23A to 25B, the relative arrangement of the touch sensor 5 and the button switches 6R and 6L with respect to the contact position of the finger on the inner surface 21 of the cladding 20 of the main body 2 in the ring-type device 1 of the present embodiment will be described.

Figure 23A:
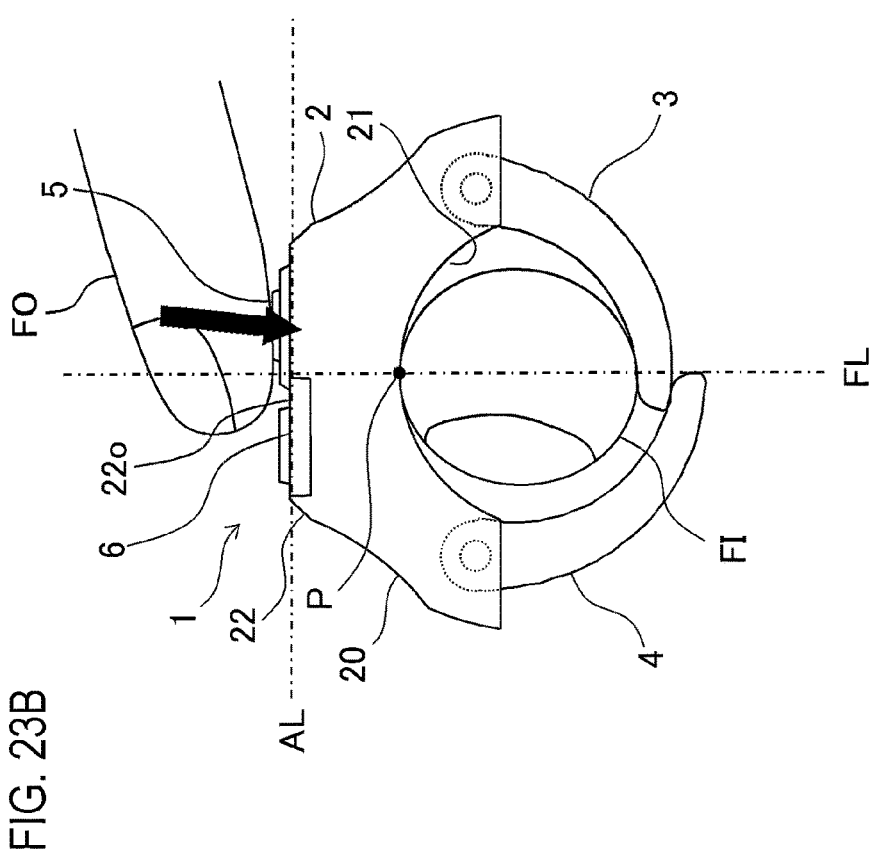
FIGS. 23A and 23B are schematic front views of the ring-type device 1.
Figure 23B:
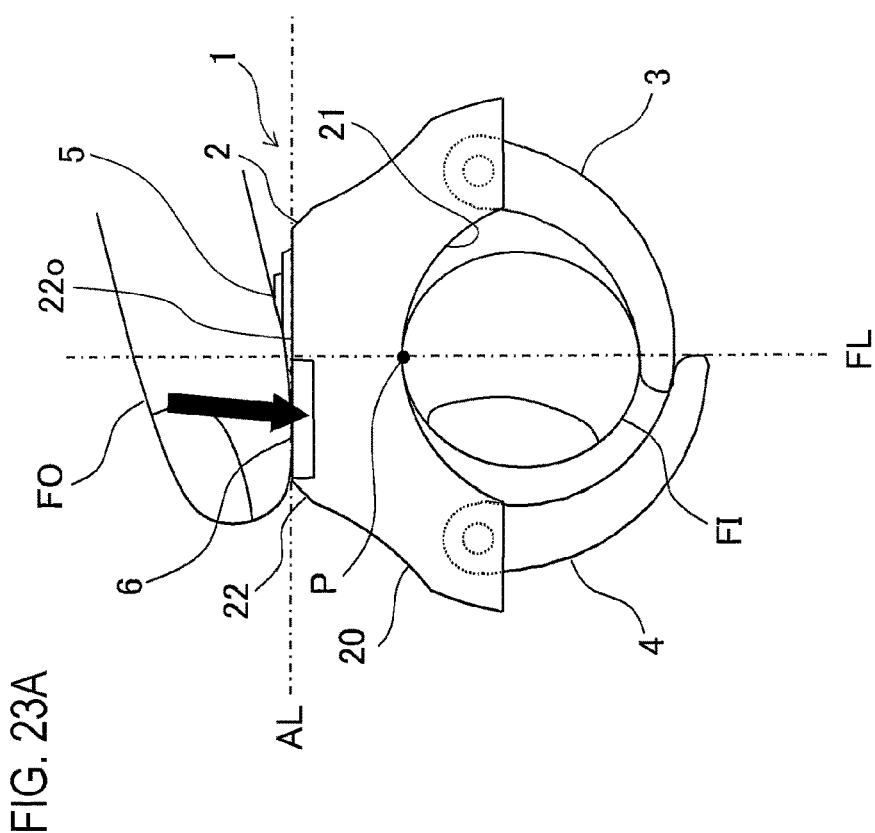

FIG. 23A is a schematic front view of the ring-type device 1 of the present embodiment, showing the state when the user is pressing the button switches 6R and 6L with the finger FO. FIG. 23B is a schematic front view of the ring-type device 1 of the present embodiment, showing the state when the user is pressing the touch sensor 5 with the finger FO.

As shown in FIG. 23A and other figures, when the ring-type device 1 is viewed in the insertion direction ID of the finger into the wearing space FS, an imaginary line along the operating surface 220 (the surface on which the touch sensor 5 and the button switches 6R and 6L are aligned in the circumferential direction of the main body 2) of the outer surface 22 of the cladding 20 of the main body 2 is defined as AL. In addition, an imaginary line (virtual reference line) that passes through the deepest part P of the inner surface 21 of the cladding 20 of the main body 2 and is perpendicular to the imaginary line AL is defined as FL. In the ring-type device 1 of the present embodiment, when viewed in the insertion direction ID of the finger, the touch sensor 5 and the button switches 6R and 6L aligned in the circumferential direction of the main body 2 are arranged on opposite sides of the imaginary line FL (symmetrical in the circumferential direction with respect to the imaginary line FL). That is, the touch sensor 5 is located on the front side of the main body 2 with respect to the imaginary line FL (one side, first side), and the button switches 6R and 6L are located on the back side of the main body 2 with respect to the imaginary line FL (the other side, second side).

The deepest part P of the inner surface 21 for determining the imaginary line FL may be defined as a position where the finger FI inserted into the wearing space FS always comes into contact with the inner surface 21. Alternatively, the imaginary line FL may be an imaginary line that passes through the reference center F2C of the finger inserted into the wearing space FS and is perpendicular to the imaginary line AL. Alternatively, the deepest part P may be defined as a position included in a region of the inner surface 21 located opposite the region where the first arm 3 and the second arm 4 overlap with respect to the reference center F2C of the finger inserted into the wearing space FS.

The ring-type device 1 of the present embodiment is arranged so that the touch sensor 5 as the first operating portion and the button switches 6R and 6L as the second operating portion are arranged in the circumferential direction of the main body 2. Therefore, the force that the touch sensor 5 receives from the finger FO by the pressing operation may include a component force that generates a moment with respect to the main body 2, with the contact region of the finger FI and the inner surface 21 including the deepest part P as the base point. Similarly, the force that the button switches 6R and 6L receive from the finger FO when pressed may include a component force that generates a moment with respect to the main body 2, with the contact region of the finger FI and the inner surface 21 including the deepest part P as the base point. Such a moment may be generated inevitably due to the layout in which the touch sensor 5 and the button switches 6R and 6L are arranged in the circumferential direction of the main body 2. However, by arranging the touch sensor 5 and the button switches 6R and 6L, which are arranged close to each other in the circumferential direction of the main body 2, on opposite sides of the imaginary line FL, it is possible to minimize the magnitude of the generated moment.

FIG. 24A is a schematic front view of a ring-type device 1e of a third comparative example, showing the state when the user presses the button switches 6R and 6L with the finger FO. FIG. 24B is a schematic front view of the ring-type device 1e of the third comparative example, showing the state when the user presses the touch sensor 5 with the finger FO.

As shown in FIGS. 24A and 24B, the ring-type device 1e of the third comparative example is configured such that the touch sensor 5 and the button switches 6R and 6L are arranged so that the touch sensor 5 overlaps with the imaginary line FL when viewed in the insertion direction ID of the finger. That is, the touch sensor 5 and the button switches 6R and 6L arranged in the circumferential direction of the main body 2 are arranged closer to the back side in the circumferential direction of the main body 2 (biased toward the back side with respect to the imaginary line FL). In this configuration, as shown in FIG. 24B, it is possible to reduce the magnitude of the moment described above when pressing the touch sensor 5.

However, as shown in FIG. 24A, when the button switches 6R and 6L are pressed, the magnitude of the generated moment cannot be reduced, and a force that moves the main body 2 toward the back side in the circumferential direction may act on the main body 2. This may cause the ring-type device 1e to rotate with respect to the finger FI inserted into the wearing space FS, and the wearing state of the ring-type device 1e with respect to the finger FI may become unstable.

In the ring-type device 1e of the third comparative example, the button switches 6R and 6L are arranged away from the back side in the circumferential direction with respect to the finger FO. Due to the layout in which the finger FO approaches the button switches 6R and 6L from the front side to the back side in the circumferential direction, the direction of the pressing force of the finger FO when pressing the button switches 6R and 6L approaches the direction from the front side to the back side in the circumferential direction. As a result, the magnitude of the above-mentioned moment generated in the main body 2 increases, and a force that rotates the ring-type device 1e with respect to the finger FI inserted into the wearing space FS is likely to be generated.

Figure 25A:
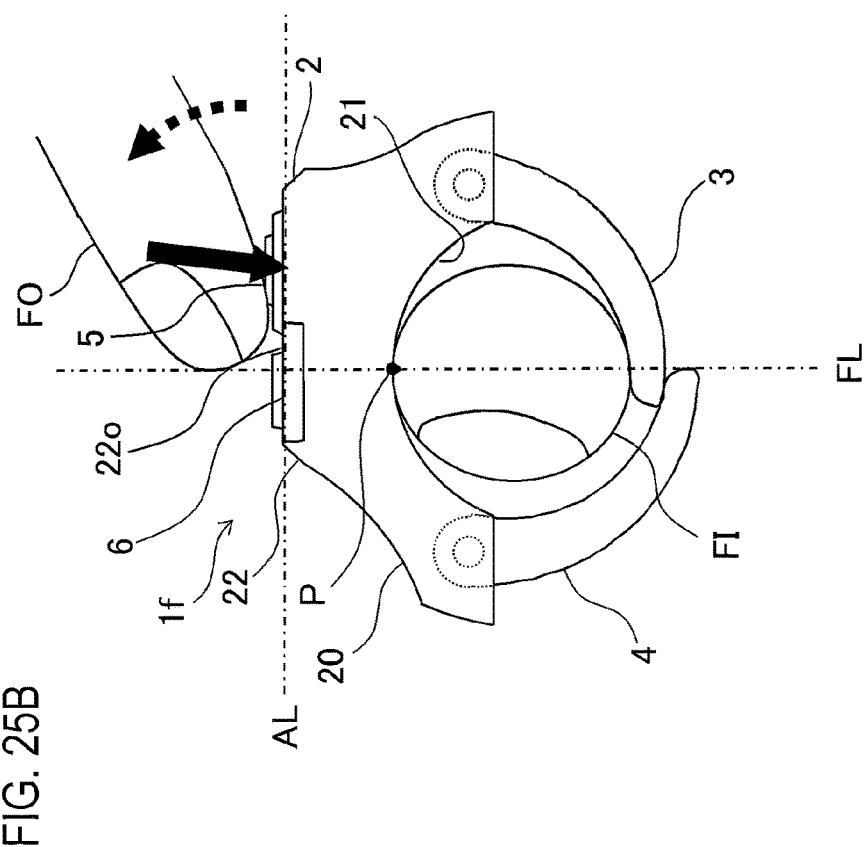
FIGS. 25A and 25B are schematic front views of a ring-type device 1f according to a fourth comparative example.
Figure 25B:
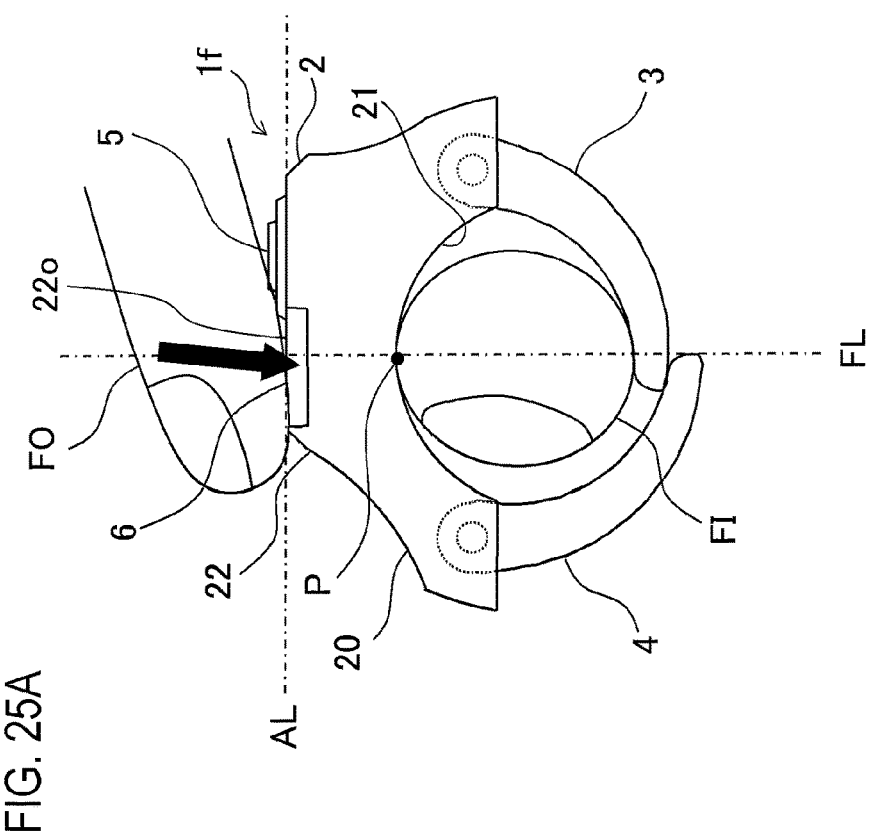

FIG. 25A is a schematic front view of a ring-type device 1f of a fourth comparative example, showing the state when the user presses the button switches 6R and 6L with the finger FO. FIG. 25B is a schematic front view of the ring-type device 1f of the fourth comparative example, showing the state when the user presses the touch sensor 5 with the finger FO.

As shown in FIGS. 25A and 25B, the ring-type device 1f of the fourth comparative example is configured such that the touch sensor 5 and the button switches 6R and 6L are arranged so that the button switches 6R and 6L overlap the imaginary line FL when viewed in the insertion direction ID of the finger. That is, the touch sensor 5 and the button switches 6R and 6L arranged in the circumferential direction of the main body 2 are arranged closer to the front side in the circumferential direction of the main body 2 (biased toward the front side with respect to the imaginary line FL).

As described above, the finger FO, especially when the finger FO is the thumb, is in a posture of approaching the touch sensor 5 and the button switches 6R and 6L from the front side toward the back side in the circumferential direction of the main body 2. Therefore, the direction of the pressing force of the finger FO is likely to include an angle from the front side to the back side, and therefore the magnitude of the generated moment is reduced even when pressing either the touch sensor 5 or the button switches 6R and 6L.

However, as shown in FIG. 25B, when pressing the button switches 6R and 6L arranged near the front side of the main body 2, it is difficult to press the button switches 6R and 6L unless the angle of the finger FO is adjusted, especially when the finger FO is the thumb, and the posture during the pressing operation becomes uncomfortable. As a result, the wearing state of the ring-type device 1f on the finger FI may become unstable, which may lead to erroneous operations.

Compared to the third and fourth comparative examples, the ring-type device 1 of the present embodiment can stabilize the wearing state of the ring-type device 1 on the finger FI, and also can obtain stable operability without forcing the finger FO to take an unnatural posture during the pressing operation.

In the present embodiment, the second boundary identification rib 26 is a single rib that extends continuously in the circumferential direction of the finger, but is not limited to this configuration. For example, the rib may be divided in the circumferential direction, that is, a plurality of ribs each extending in the circumferential direction may be continuously arranged in the circumferential direction. Alternatively, a plurality of protrusions may be continuously arranged in the circumferential direction.

In the present embodiment, the first boundary identification rib 25 is a single rib formed in a continuous annular shape, but is not limited to this configuration. For example, it may not be a completely closed annular shape, but may be a rib that is approximately C-shaped, with a part of the circle interrupted. Alternatively, for example, a plurality of ribs each extending in a circular arc shape may be continuously arranged in an annular shape. Alternatively, a plurality of protrusions may be continuously arranged in an annular shape. Furthermore, the annular shape is not limited to a perfect circle as in the present embodiment, but may be an ellipse. Alternatively, it may be a polygonal shape instead of a circle.

Second Embodiment

A ring-type device 1g according to a second embodiment of the present invention will be described with reference to FIGS. 26A to 28. Here, the configuration of the second embodiment that differs from the configuration of the first embodiment will be described. The same reference numerals will be used to designate the configuration of the second embodiment that is common to the configuration of the first embodiment, and descriptions thereof will be omitted.

In the present embodiment, the first arm 3b closest to the inner surface 21 of the main body 2 and the second arm 4b closest to the inner surface 21 have an overlapping region when viewed in the direction of the rotation axis 32x of the first arm 3b or the rotation axis 42x of the second arm 4b.

Figure 26A:
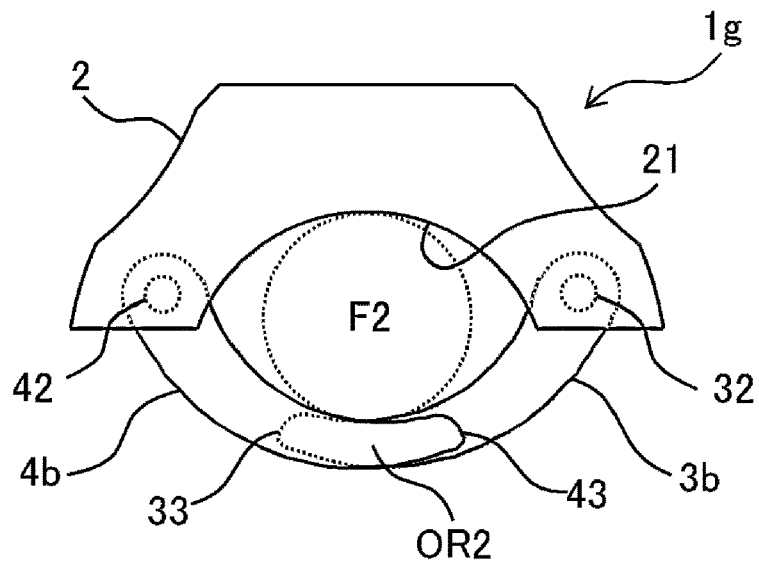
FIGS. 26A to 26C are schematic views illustrating the change in posture of a first arm 3b and a second arm 4b.
Figure 26B:
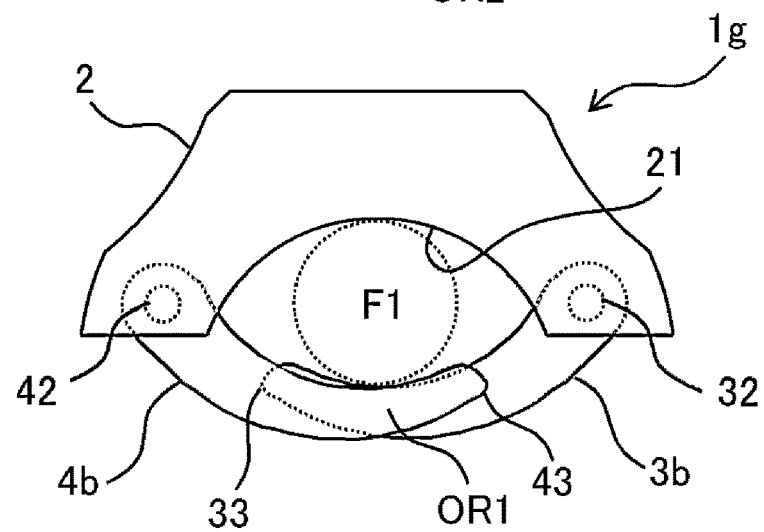
Figure 26C:
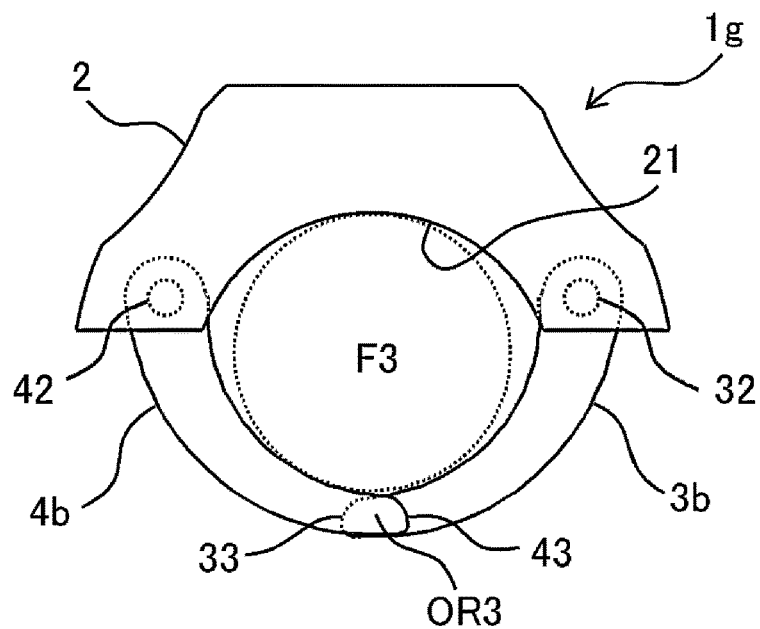

As shown in FIGS. 26A to 27A, in the ring-type device 1g of the present embodiment, at least the tip sides of the first arm 3b and the second arm 4b are shifted from each other in the insertion direction ID. That is, the ring-type device 1g is worn in such a way that both the first arm 3b and the second arm 4b are in contact with the finger F. As shown in FIGS. 26A to 26C, the overlapping region between one arm and the other arm when viewed in the direction along the insertion direction ID or the rotation axis 32x or 42x gradually widens in the order of regions OR3, OR2, and OR1 from finger F3 to finger F1.

In this way, the first arm 3b and the second arm 4b are arranged alternately in the insertion direction ID, so that the size of the outer shape of the ring-type device 1g in the direction perpendicular to the insertion direction ID is compressed compared to that of the ring-type device 1 of the first embodiment, and the ease of gripping when worn on the finger F can be improved.

Figure 27A:
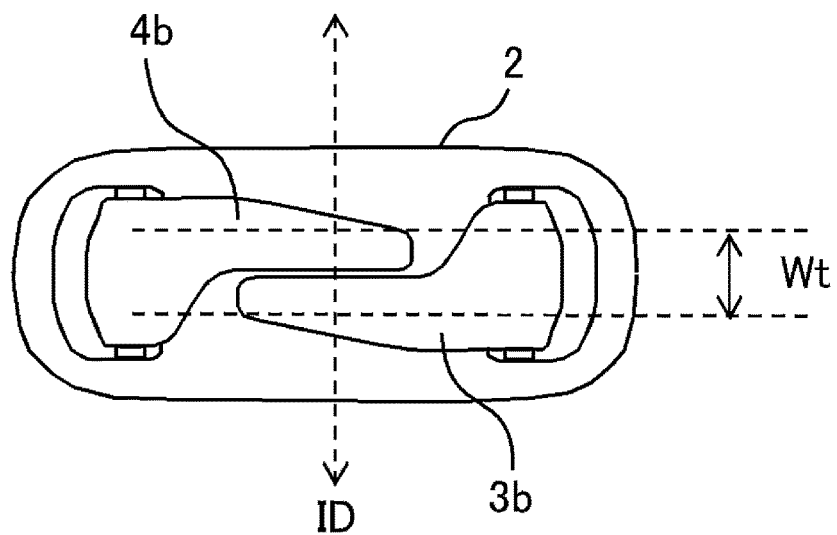
FIGS. 27A and 27B are bottom views of a ring-type device 1g.

As shown in FIG. 27A, the first arm 3b and the second arm 4b may be configured to have a shape that is approximately symmetrical in the insertion direction ID. Furthermore, the first arm 3b and the second arm 4b shown in FIG. 27A are configured so that the width in the insertion direction ID gradually narrows as they approach the tip. According to this configuration, for example, in the third wearing mode shown in FIG. 4C, the first arm 3b and the second arm 4b are prevented from interfering with the gripping of the finger.

As shown in FIG. 27A, the distance Wt from the outer end of the tip surface of the first arm 3b to the outer end of the tip surface of the second arm 4b in the insertion direction ID may be 20 mm or less, or may be equal to or less than the width of the main body 2 in the insertion direction ID. More preferably, the distance Wt is 8 mm or less, which is suitable for storing the first arm 3b and the second arm 4b between the first and second joints of the finger F.

Figure 27B:
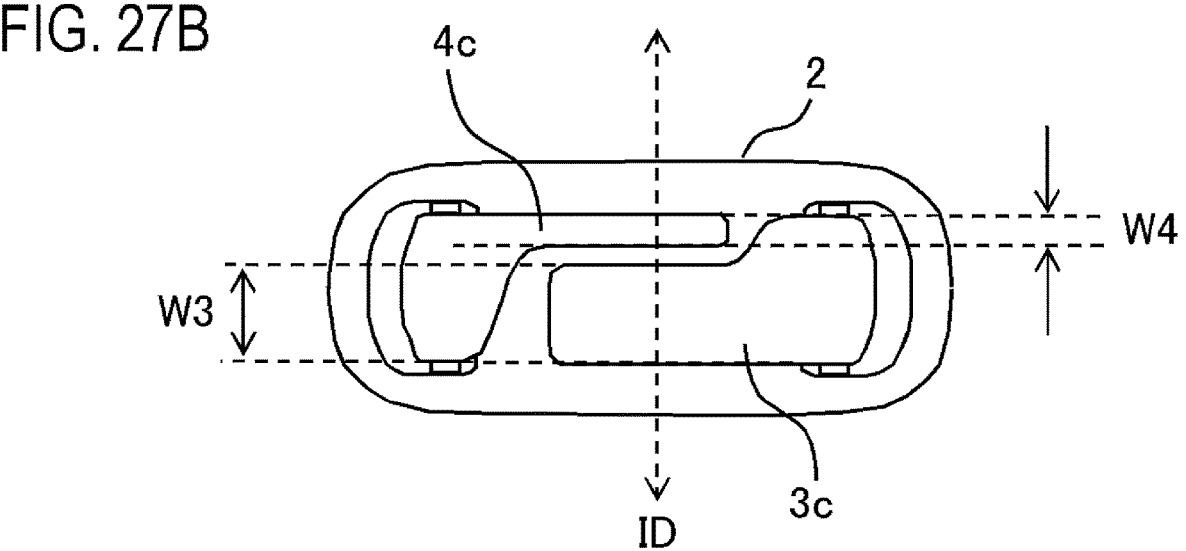

In addition, as shown in FIG. 27B, the width in the insertion direction ID may be different between the first arm 3c and the second arm 4c. That is, the width W3 in the insertion direction ID at the tip-side portion of the first arm 3c is configured to be larger than the width W4 in the insertion direction ID at the tip-side portion of the second arm 4c. For example, the width may be set according to the difference between the biasing force of the torsion coil spring 32s and the biasing force of the torsion coil spring 42s so that the force of the first arm 3c biasing the finger F and the force of the second arm 4c biasing the finger F are uniform.

Figure 28:
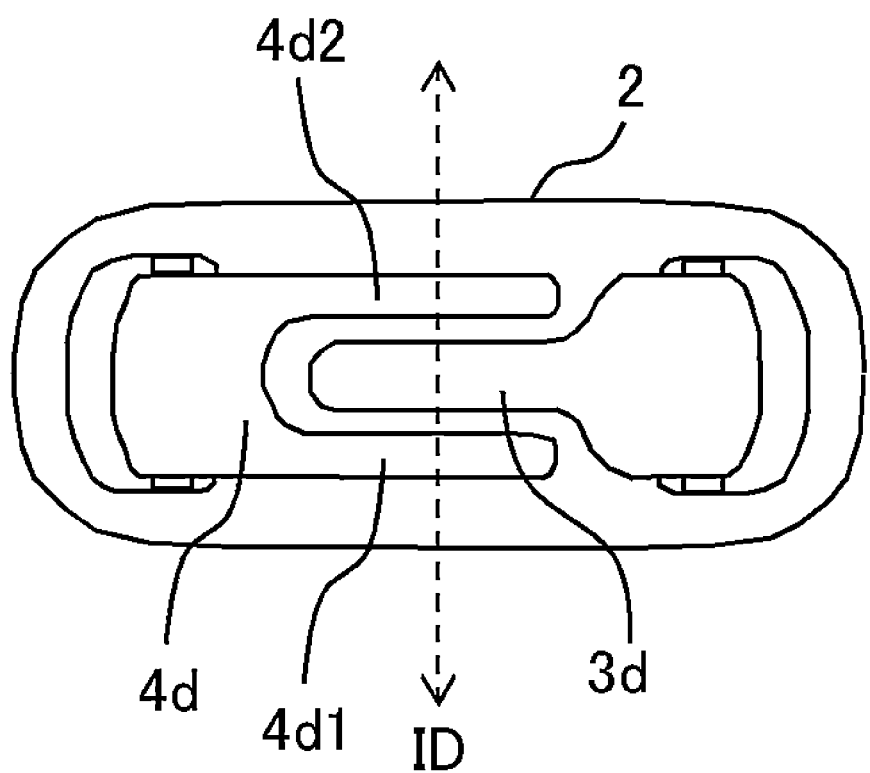
FIG. 28 is a bottom view of the ring-type device 1g.

As shown in FIG. 28, the first arm 3d and the second arm 4d may be arranged in a comb-like shape in a staggered manner in the insertion direction ID. That is, the second arm 4d has a pair of first half arm 4d1 and second half arm 4d2, and the first arm 3d is arranged between the first half arm 4d1 and the second half arm 4d2 in the insertion direction ID. The combined configuration of the first arm 3d and the second arm 4d is symmetrical with respect to the insertion direction ID, and the finger F can be inserted into the wearing space FS in the same way from either the left or right side in the insertion direction ID. That is, when wearing the ring-type device 1g on the finger F, there is no need to worry about the insertion direction, and the wearing property can be improved.

The above-mentioned embodiments can be combined with each other as much as possible.

According to the present invention, the operability of a ring-type device having a plurality of operating portions can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-095637, filed on Jun. 9, 2023 and No. 2023-095601, filed on Jun. 9, 2023, which are hereby incorporated by reference herein in their entireties.

What is claimed is:

1. A ring-type device to be worn on a user's finger, comprising:
   an annular body having an inner surface surrounding a wearing space and an outer surface opposite the inner surface;
   a first operating portion provided on the outer surface;
   a second operating portion provided on the outer surface at a position different from the first operating portion; and
   a rib provided between the first operating portion and the second operating portion on the outer surface, wherein
   the first operating portion and the second operating portion are arranged on the outer surface so as to be aligned in an insertion direction of the finger into the wearing space,
   the rib is provided on the outer surface to extend along a circumferential direction around the insertion direction,
   the first operating portion and the second operating portion have a shape symmetrical with respect to the rib in the insertion direction, and
   a height of a tip of the rib from the outer surface is higher than a height of the first operating portion and a height of the second operating portion from the outer surface.

2. The ring-type device according to claim 1, further comprising a recess provided on the outer surface at a position adjacent to the first operating portion or the second operating portion in the circumferential direction, on which a finger different from the finger inserted into the wearing space can be placed, wherein at least one of a width in the insertion direction and a width in the circumferential direction of the recess is 10.0 mm or more.

3. A ring-type device to be worn on a user's finger, comprising:
   an annular body having an inner surface surrounding a wearing space and an outer surface opposite the inner surface;
   a first operating portion provided on the outer surface;
   a second operating portion provided on the outer surface at a position different from the first operating portion; and
   a rib provided between the first operating portion and the second operating portion on the outer surface, wherein
   the first operating portion and the second operating portion are arranged on the outer surface so as to be aligned in a circumferential direction around an insertion direction of the finger into the wearing space,
   the second operating portion includes a first push button and a second push button aligned in the insertion direction of the finger into the wearing space, and
   an outer end of the first push button and an outer end of the second push button in the insertion direction form part of a corner between the outer surface of the annular body and a side surface of the annular body.

4. The ring-type device according to claim 3, wherein the rib is provided on the outer surface so as to surround the first operating portion.

5. The ring-type device according to claim 3, wherein a height of a tip of the rib from the outer surface is equal to or greater than a height of the second operating portion and is lower than a height of the first operating portion, and a difference between the height of the rib and the height of the second operating portion is 0.3 mm or more.

6. The ring-type device according to claim 3, wherein the rib is a first rib and a second rib is arranged between the first push button and the second push button, the second rib being provided to extend along the circumferential direction around the insertion direction,
   a height of a tip of the second rib from the outer surface is higher than the heights of the first push button and the second push button from the outer surface,
   a difference between the height of the second rib and the heights of the first push button and the second push button is at least 0.3 mm and not more than 1.0 mm,
   a width of the second rib in the insertion direction is at least 1.0 mm and not more than 2.5 mm,
   a distance from an outer end of the first push button to an outer end of the second push button in the insertion direction is 25.0 mm or less, and
   a width of the first push button and the second push button in the circumferential direction around the insertion direction is 8.0 mm or more.

7. The ring-type device according to claim 3, further comprising a recess provided on the outer surface at a position adjacent to the first operating portion or the second operating portion in the circumferential direction, on which a finger different from the finger inserted into the wearing space can be placed, wherein at least one of a width in the insertion direction and a width in the circumferential direction of the recess is 10.0 mm or more.

8. The ring-type device according to claim 3, wherein, in a view in an insertion direction of the finger into the wearing space,
   the first operating portion is located on a first side with respect to a virtual reference line that passes through a position where the finger contacts the inner surface and is perpendicular to an imaginary line along a direction in which the first operating portion and the second operating portion are aligned, and
   the second operating portion is located on a second side opposite to the first side with respect to the virtual reference line.

9. A ring-type device to be worn on a user's finger, comprising:
   an annular body having an inner surface surrounding a wearing space and an outer surface opposite to the inner surface;
   a first operating portion provided on the outer surface;
   a second operating portion provided on the outer surface at a position different from the first operating portion;
   a rib provided between the first operating portion and the second operating portion on the outer surface;
   a first recess provided at a position adjacent to an opposite side of the first operating portion from the second operating portion in a circumferential direction, on which a finger different from the finger inserted into the wearing space can be placed; and
   a second recess provided at a position adjacent to an opposite side of the second operating portion from the first operating portion in the circumferential direction, on which a finger different from the finger inserted into the wearing space can be placed, wherein
   the first operating portion and the second operating portion are arranged on the outer surface so as to be aligned in the circumferential direction around an insertion direction of the finger into the wearing space, and
   a portion between the first recess and the first operating portion and a portion between the second recess and the second operating portion have shapes that are asymmetrical to each other.

10. The ring-type device according to claim 9, wherein the rib is provided on the outer surface so as to surround the first operating portion.

11. The ring-type device according to claim 9, wherein a height of a tip of the rib from the outer surface is equal to or greater than a height of the second operating portion and is lower than a height of the first operating portion, and a difference between the height of the rib and the height of the second operating portion is 0.3 mm or more.

12. The ring-type device according to claim 9, wherein the second operating portion includes a first push button and a second push button aligned in the insertion direction of the finger into the wearing space, the rib is a first rib and a second rib is arranged between the first push button and the second push button, the second rib is provided to extend along the circumferential direction around the insertion direction, a height of a tip of the second rib from the outer surface is higher than the heights of the first push button and the second push button from the outer surface, a difference between the height of the second rib and the heights of the first push button and the second push button is at least 0.3 mm and not more than 1.0 mm, a width of the second rib in the insertion direction is at least 1.0 mm and not more than 2.5 mm, a distance from an outer end of the first push button to an outer end of the second push button in the insertion direction is 25.0 mm or less, and a width of the first push button and the second push button in the circumferential direction around the insertion direction is 8.0 mm or more.

13. The ring-type device according to claim 9, further comprising a recess provided on the outer surface at a position adjacent to the first operating portion or the second operating portion in the circumferential direction, on which a finger different from the finger inserted into the wearing space can be placed, wherein at least one of a width in the insertion direction and a width in the circumferential direction of the recess is 10.0 mm or more.

14. The ring-type device according to claim 9, wherein, in a view in an insertion direction of the finger into the wearing space, the first operating portion is located on a first side with respect to a virtual reference line that passes through a position where the finger contacts the inner surface and is perpendicular to an imaginary line along a direction in which the first operating portion and the second operating portion are aligned, and the second operating portion is located on a second side opposite to the first side with respect to the virtual reference line.

* * * * *